(12) United States Patent
Hong et al.

(10) Patent No.: US 8,451,560 B2
(45) Date of Patent: May 28, 2013

(54) MAGNETIC HEAD WITH FLARED WRITE POLE WITH MULTIPLE NON-MAGNETIC LAYERS THEREOVER

(75) Inventors: Liubo Hong, San Jose, CA (US); Aron Pentek, San Jose, CA (US); Yi Zheng, San Ramon, CA (US)

(73) Assignee: HGST Netherlands B.V., San Jose, CA (US)

( * ) Notice: Subject to any disclaimer, the term of this patent is extended or adjusted under 35 U.S.C. 154(b) by 496 days.

(21) Appl. No.: 12/634,480

(22) Filed: Dec. 9, 2009

(65) Prior Publication Data
US 2011/0135962 A1 Jun. 9, 2011

(51) Int. Cl.
*G11B 5/11* (2006.01)
*G11B 5/187* (2006.01)
*G11B 5/23* (2006.01)

(52) U.S. Cl.
USPC ............ 360/119.04; 360/119.03; 360/125.12; 360/125.13; 360/125.14; 360/125.15; 360/125.3

(58) Field of Classification Search
USPC ............ 360/125.03, 125.06, 125.08, 125.11, 360/125.12, 125.15, 125.3, 119.02, 119.03, 360/119.04, 125.09, 125.13, 125.14
See application file for complete search history.

(56) References Cited

U.S. PATENT DOCUMENTS

| | | | |
|---|---|---|---|
| 4,807,076 A | 2/1989 | Nakashima et al. | |
| 6,693,768 B1 | 2/2004 | Crue et al. | |
| 7,006,326 B2 | 2/2006 | Okada et al. | |
| 7,042,682 B2 | 5/2006 | Hu et al. | |
| 7,159,302 B2 | 1/2007 | Feldbaum et al. | |
| 7,180,705 B2 | 2/2007 | Matono et al. | |
| 7,212,379 B2 | 5/2007 | Hsu et al. | |
| 7,245,454 B2 | 7/2007 | Aoki et al. | |
| 7,248,437 B2 | 7/2007 | Yazawa et al. | |
| 7,251,878 B2 | 8/2007 | Le et al. | |
| 7,253,991 B2 | 8/2007 | Fontana, Jr. et al. | |
| 7,253,992 B2 | 8/2007 | Chen et al. | |
| 7,324,304 B1 | 1/2008 | Benakli et al. | |
| 7,327,533 B2 | 2/2008 | Guan | |

(Continued)

FOREIGN PATENT DOCUMENTS

| EP | 1835489 A2 | 9/2007 |
|---|---|---|
| JP | 3209609 A | 9/1991 |
| JP | 6329311 A | 11/1994 |
| JP | 2009076127 A | 4/2009 |

OTHER PUBLICATIONS

Lijie Guan, Joe Smyth, Moris Dovek, Sui-Yan Chan, and Tatsuya Shimizu, A Trailing Shield Perpendicular Writer Design With Tapered Write Gap for High Density Recording, IEEE Transactions on Magnetics, Nov. 2008, pp. 3396-3399, vol. 44, No. 11.

(Continued)

*Primary Examiner* — Jefferson Evans
(74) *Attorney, Agent, or Firm* — Patterson & Sheridan, LLP

(57) ABSTRACT

Methods for fabrication of tapered magnetic poles with a non-magnetic front bump layer. A magnetic pole may have a tapered surface at or near an air bearing surface (ABS), wherein a thickness of the write pole increases in a direction away from the ABS. A non-magnetic front bump layer may be formed on the tapered surface of the magnetic pole and away from the ABS. The front bump layer may increase the separation distance between a shield layer and the magnetic pole near the tapered surface, thereby improving the performance of the write head.

15 Claims, 31 Drawing Sheets

U.S. PATENT DOCUMENTS

| | | | |
|---|---|---|---|
| 7,343,668 B2 | 3/2008 | Kobayashi | |
| 7,365,942 B2 | 4/2008 | Sasaki et al. | |
| 7,375,925 B2 | 5/2008 | Sasaki et al. | |
| 7,394,621 B2 | 7/2008 | Li et al. | |
| 7,417,824 B2 | 8/2008 | Kameda | |
| 7,417,825 B2 | 8/2008 | Sasaki et al. | |
| 7,430,095 B2 | 9/2008 | Benakli et al. | |
| 7,436,628 B2 | 10/2008 | Kameda et al. | |
| 7,440,230 B2 | 10/2008 | Hsu et al. | |
| 7,443,633 B2 | 10/2008 | Tagami et al. | |
| 7,457,080 B2 | 11/2008 | Watabe et al. | |
| 7,924,528 B2 * | 4/2011 | Sasaki et al. | 360/125.15 |
| 2005/0219743 A1 | 10/2005 | Guan et al. | |
| 2005/0219747 A1 * | 10/2005 | Hsu et al. | 360/126 |
| 2007/0285837 A1 | 12/2007 | Im et al. | |
| 2008/0019045 A1 | 1/2008 | Otagiri et al. | |
| 2008/0297953 A1 * | 12/2008 | Matono et al. | 360/319 |
| 2008/0316653 A1 | 12/2008 | Sasaki et al. | |
| 2009/0059426 A1 | 3/2009 | Sasaki et al. | |
| 2009/0122445 A1 | 5/2009 | Jiang et al. | |
| 2009/0297946 A1 | 12/2009 | Yue et al. | |
| 2010/0157476 A1 * | 6/2010 | Kudo et al. | 360/125.12 |
| 2010/0172054 A1 * | 7/2010 | Yamaguchi et al. | 360/125.03 |
| 2011/0134568 A1 | 6/2011 | Chen et al. | |
| 2011/0134569 A1 | 6/2011 | Allen et al. | |
| 2011/0135959 A1 | 6/2011 | Hong | |

OTHER PUBLICATIONS

Hitachi Corporation and Jeffrey Lille, Non-magnetic metrology layer for perpendicular pole, IP.com Prior Art Database Technical Disclosure, Sep. 27, 2004, IP.com Electronic Publication IPCOM000031484D.

IBM TDB, T. J. Beaulieu and R. W. Wood, Improved Perpendicular Recording Head, IP.com Prior Art Database Technical Disclosure, Jan. 30, 2005, IP.com Electronic Publication IPCOM000037905D.

IBM TDB and T. A. Schwartz, Perpendicular Recording Read Write Head With High Reluctance Leg, IP.com Prior Art Database Technical Disclosure, original publication date: Sep. 1, 1981, IP.com Electronic Publication IPCOM000053181D dated Feb. 12, 2005.

S. Wang, E. Louis, J. Wolfson, R. Anderson, and M. H. Kryder, A Perpendicular Contact Recording Head with High Moment Laminated FeAin/NiFe Pole Tips, IEEE Transactions on Magnetics, Nov. 1994, pp. 3897-3899, vol. 30, No. 6.

* cited by examiner

MAGNETIC HEAD WITH FLARED WRITE POLE WITH MULTIPLE NON-MAGNETIC LAYERS THEREOVER

BACKGROUND OF THE INVENTION

1. Field of the Invention

Embodiments of the present invention generally relate to magnetic write heads, and more specifically to fabrication of magnetic write heads with tapered magnetic poles and a front bump layer.

2. Description of the Related Art

Magnetic head-based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly which in turn is attached to an actuator arm. As the magnetic disk rotates at an operating speed, the moving air generated by the rotating disk in conjunction with the physical design of the slider lifts the magnetic head, allowing it to glide or "fly" slightly above and over the disk surface on a cushion of air, referred to as an air bearing.

Magnetic disks are desirable mediums of storage because they are nonvolatile; i.e., no power is required to preserve the data. There has been increasing progress in the field of magnetic disk storage system technology in recent years. Such success has made storage systems an important component of modern computers. Some of the most important customer attributes of any storage system are the cost per megabyte, data rate, and access time. Improvements in areal density (the amount of information that can be placed within a given area on a disk drive), have been the chief driving force behind the historic improvement in storage cost. In fact, the areal density of magnetic disk storage systems continues to increase. As the magnetic particles that make up recorded data on a magnetic disk become ever smaller, technical difficulties in writing and reading such small bits occur.

Perpendicular recording is one approach to achieve larger areal densities when compared with longitudinal recording. In recent years, increased demand for higher data rate and areal density has driven the perpendicular head design to scale toward smaller dimensions and has resulted in a need for constant exploration of new head designs, materials, and practical fabrication methods.

Some of the problems encountered with perpendicular recording are side writing and side erasure to adjacent tracks on the disk. These problems occur from leakage and fringing of the magnetic flux from the magnetic write head. To minimize these effects, one approach is to provide either a trailing or wrap-around shield on the magnetic write head. These shields allow effective magnetic flux to be provided for writing to the disk, while avoiding leakage and fringing that can lead to the above-described problems. As the areal density of the disks increases, however, the ability of existing shields to achieve the desired results decreases.

SUMMARY OF THE INVENTION

The present invention generally relates to magnetic write heads, and more specifically to fabrication of magnetic write heads with tapered magnetic poles and a front bump layer.

One embodiment of the invention provides a method for fabricating a magnetic head. The method generally comprises forming a flared write pole having a tapered region proximate an air bearing surface of the magnetic head, wherein flared portions of the write pole are formed by removing portions of a write pole layer exposed by a masking layer, and patterning a first non-magnetic layer on the masking layer, wherein the first non-magnetic layer is formed above at least a portion of the tapered region of the write pole. The method further comprises removing portions of the masking layer exposed by the first non-magnetic layer, wherein at least a pole tip region of the write pole is exposed after removing the exposed portions of the masking layer, and depositing a second non-magnetic layer over at least the pole tip region of the write pole.

Another embodiment of the invention provides another method for fabricating a magnetic head. The method generally comprises depositing a magnetic pole layer and forming a tapered region therein proximate an air bearing surface (ABS) end of the magnetic head, patterning a first non-magnetic layer on the magnetic pole layer, wherein the first non-magnetic layer is formed on at least a portion of the tapered region of the magnetic pole layer, and patterning a masking layer on the first non-magnetic layer and portions of the magnetic pole layer exposed by the first non-magnetic layer. The method further comprises patterning a flared write pole by removing portions of the write pole layer exposed by the masking layer, and patterning a second non-magnetic layer on the masking layer.

Yet another embodiment of the invention provides a magnetic head generally comprising a flared write pole having a tapered region proximate an air bearing surface of the magnetic head, wherein flared portions of the write pole are formed by transferring a pattern of a masking layer in to a write pole layer, and a first non-magnetic layer formed on the masking layer, wherein the first non-magnetic layer is formed over the tapered region of the write pole. The magnetic head further comprises a second non-magnetic layer formed over at least a pole tip region and the tapered region of the write pole, and a shield layer formed on the second non-magnetic layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Methods for fabrication of tapered magnetic poles with a non-magnetic front bump layer. A magnetic pole may have a tapered surface at or near and air bearing surface (ABS), wherein a thickness of the write pole increases in a direction away from the ABS. A non-magnetic front bump layer may be formed on the tapered surface of the magnetic pole and away from the ABS. The front bump layer may increase the separation distance between a shield layer and the magnetic pole near the tapered surface, thereby improving the performance of the write head.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
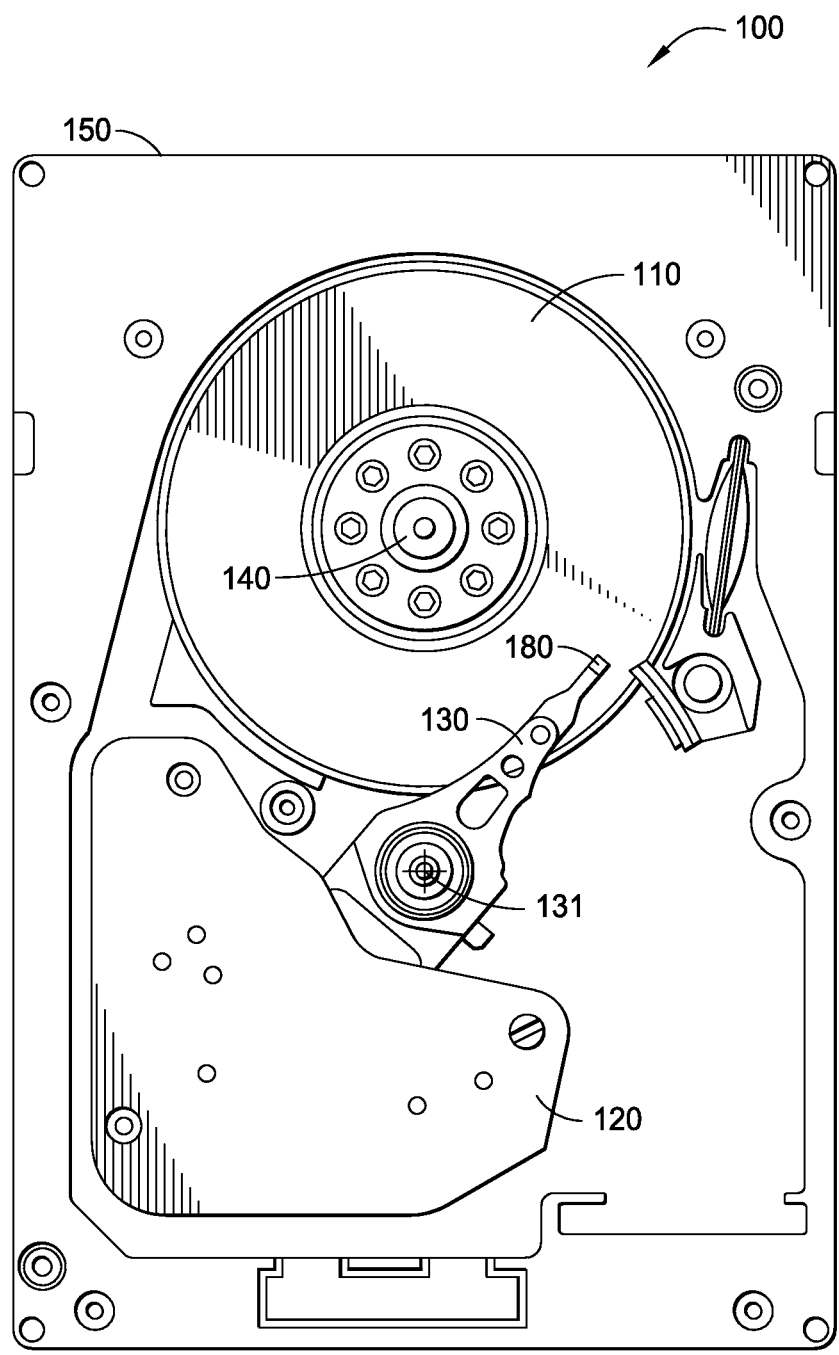
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. An electromagnetic head 180 may be positioned on a track. As each disk spins, data may be written and/or read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
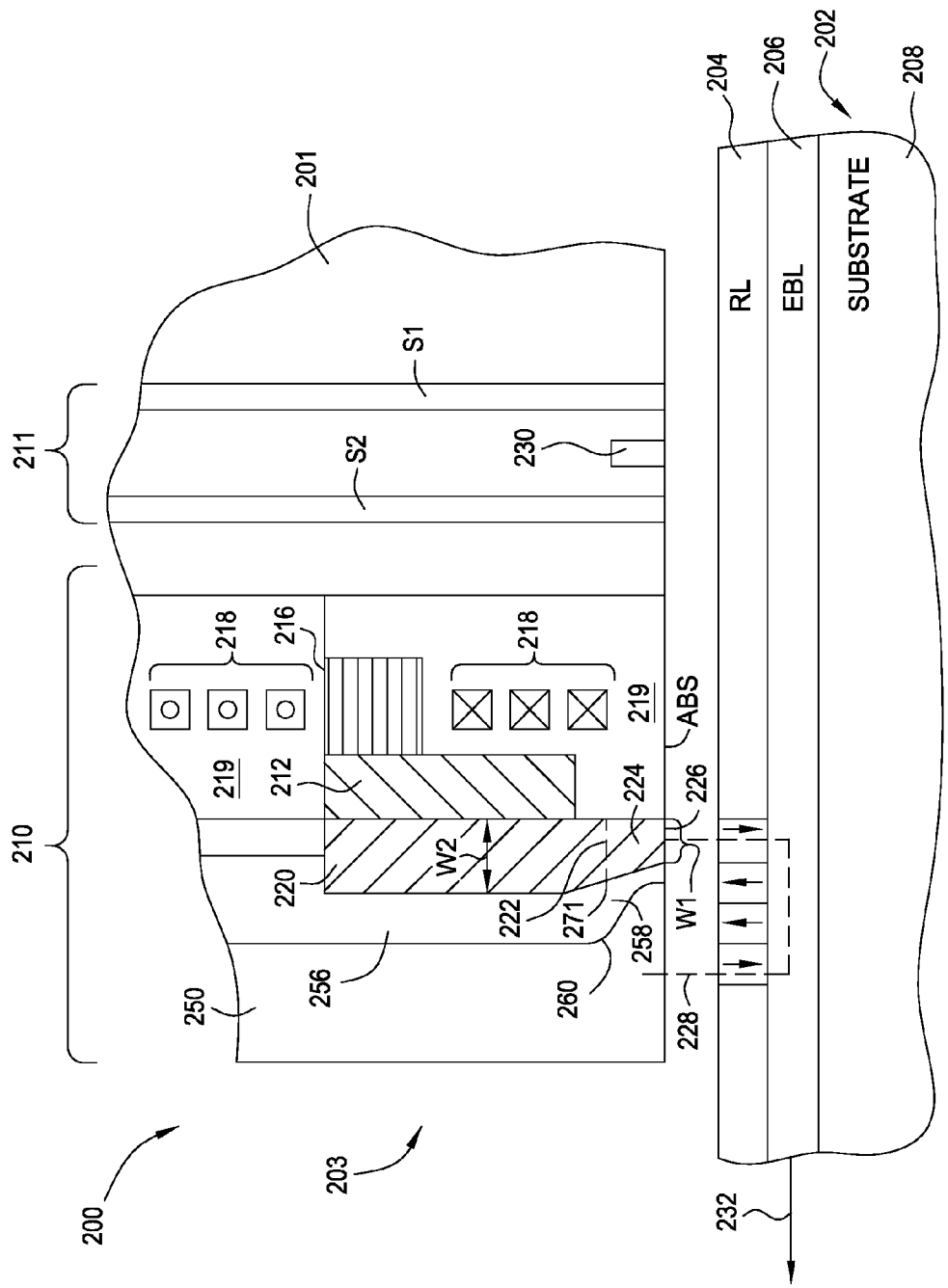
FIG. 2A is a side view of a read/write head and magnetic disk of the disk drive of FIG. 1, according to one embodiment of the invention

FIG. 2A is a fragmented, cross-sectional side view through the center of an embodiment of a read/write head 200 mounted on a slider 201 and facing magnetic disk 202. The read/write head 200 and magnetic disk 202 may correspond to the electromagnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (EPL) 206 formed on a disk substrate 208. The read/write head 200 includes an air bearing surface (ABS), a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 (also referred to herein as "WP 220") is magnetically connected to the main pole 212 and has an end 226 that defines part of the ABS of the magnetic write head 210 facing the outer surface of disk 202.

Figure 2B:
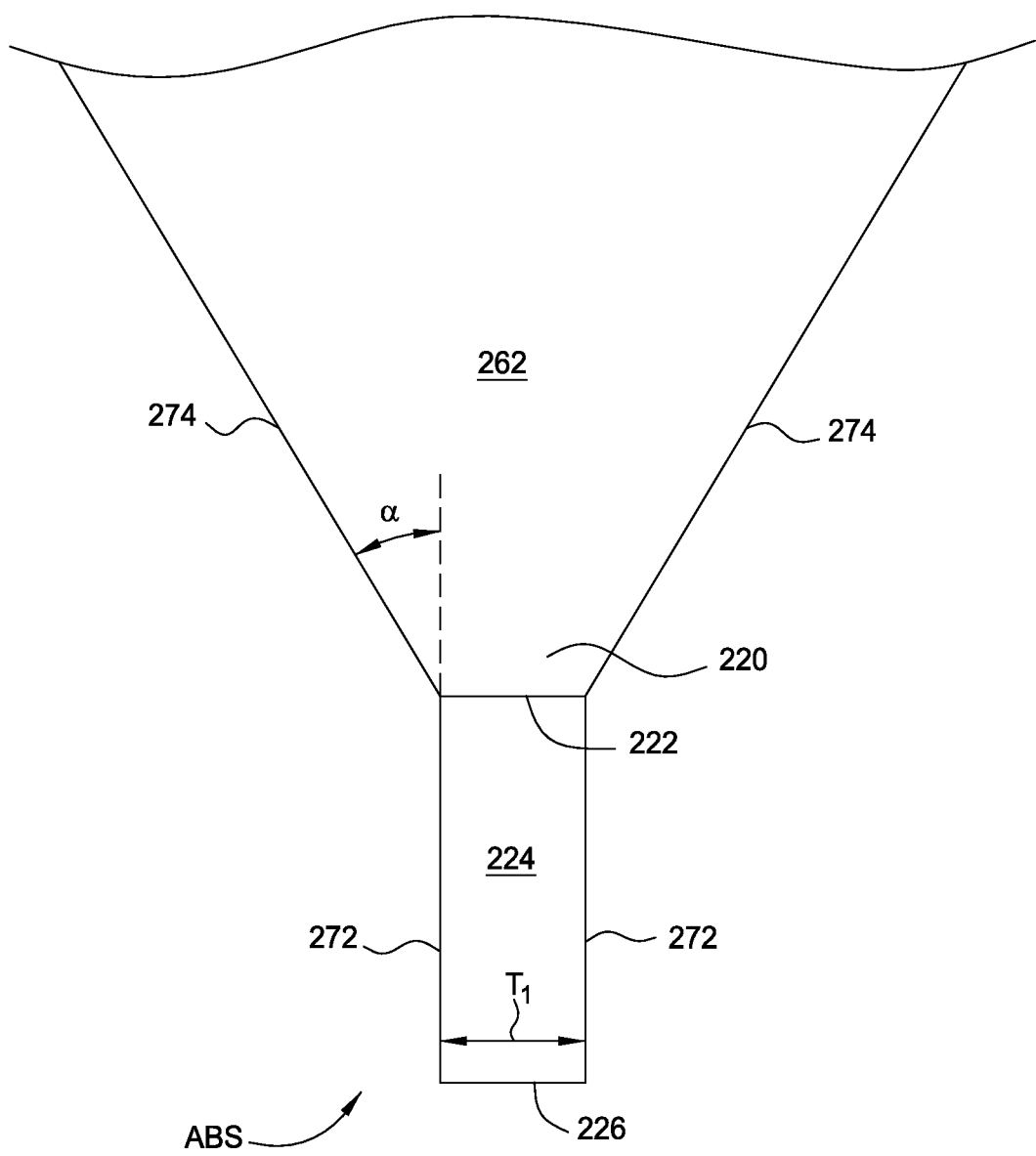
FIG. 2B is an enlarged top view of a portion of the read/write head of FIG. 2A, according to a further embodiment of the invention.

In some embodiments, write pole 220 is a flared write pole and includes a flare point 222 and a pole tip 224 that includes an end 226 that defines part of the ABS. In flared write pole embodiments, the width of the write pole 220 in a first direction (into and out of the page in FIG. 2A) increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

In one embodiment of the invention, the WP 220 may be a tapered write pole. Accordingly, as illustrated in FIG. 2A, the WP 220 may include a tapered surface 271 which increases a width of the WP 220 from a first width W1 at the ABS to a second width W2 away from the ABS. In one embodiment, the width W1 may be between around 80 nm and 180 nm, and the width W2 may be between around 200 nm and 350 nm.

The WP 220 may be tapered at the surface 271 to improve magnetic performance. For example, by reducing the width W1 at the ABS may concentrate a magnetic field generated by the WP 220 over desirable portions of the magnetic disk 202. In other words, reducing the width W1 of the WP 220 at the ABS reduces the probability that tracks adjacent to a desirable track are erroneously altered during writing operations.

While a small width of the WP 220 is desired at the ABS, it may be desirable to have a greater width of the WP 220 in areas away from the ABS. A larger width W2 of the WP 220 away from the ABS may desirably increase the magnetic flux to the WP 220, by providing a greater thickness of the WP 220 in a direction generally parallel to the ABS. In operation, write current passes through coil 218 and induces a magnetic field (shown by dashed line 228) from the WP 220 that passes through the RL 204 (to magnetize the region of the RL 204 beneath the WP 220), through the flux return path provided by the EBL 206, and back to an upper return pole 250. In one embodiment, the greater the magnetic flux of the WP 220, the greater is the probability of accurately writing to desirable regions of the RL 204.

FIG. 2A further illustrates one embodiment of the upper return pole or magnetic shield 250 that is separated from WP 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the WP 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

FIG. 2B shows an enlarged side view of the WP 220 of FIG. 2A, with the shield layer 250 and the gap layer 256 removed to show details of the WP 220, according to an embodiment of the invention. The WP 220 includes flared sides 274, which extend from the flare point 222 away from the ABS, such that the main pole increases from a first thickness $T_1$ to greater thicknesses in a direction away from the ABS.

In some embodiments, the first thickness, $T_1$ is between 30 nm and 150 nm. The flared sides 274 form an angle α with respect to the non-flared (substantially parallel) sides 272 of the pole tip 224. In one embodiment α is between about 30° and about 60°. The flare point 222 may be between about 75 nm and about 275 nm from the ABS.

Figure 3A:
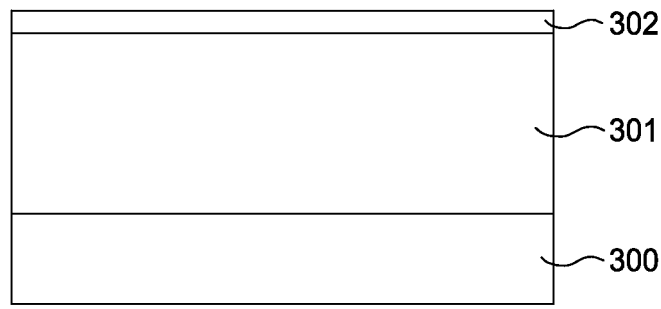
FIGS. 3A-Q illustrate an exemplary method for forming a flared write pole with a tapered region, according to an embodiment of the invention.
Figure 3B:
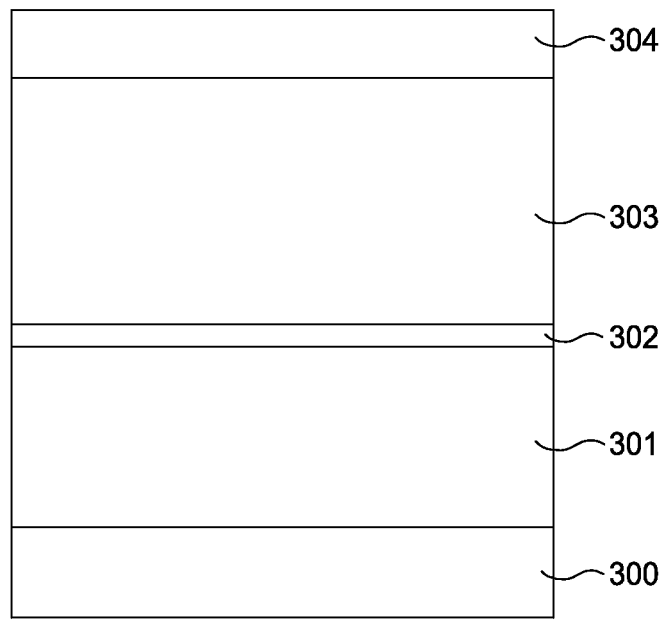
Figure 3C:
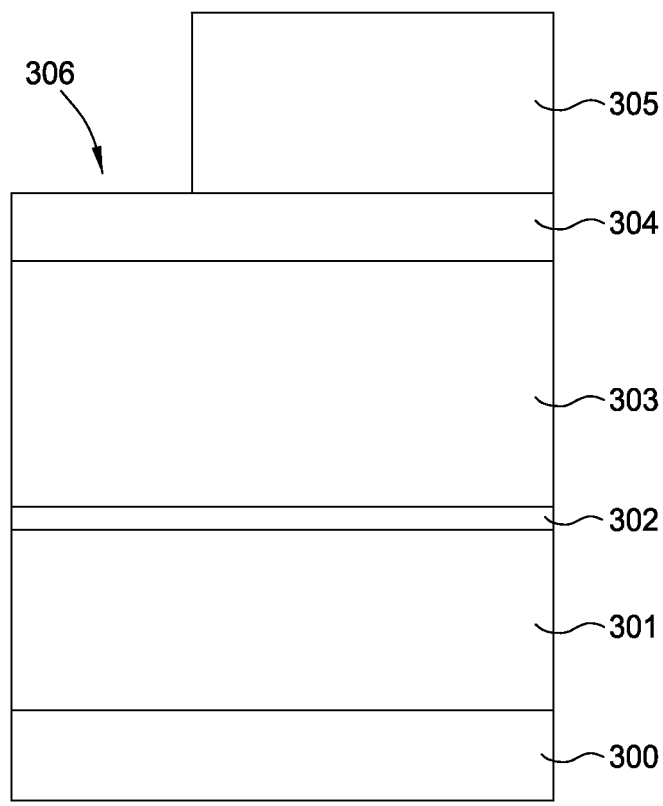
Figure 3D:
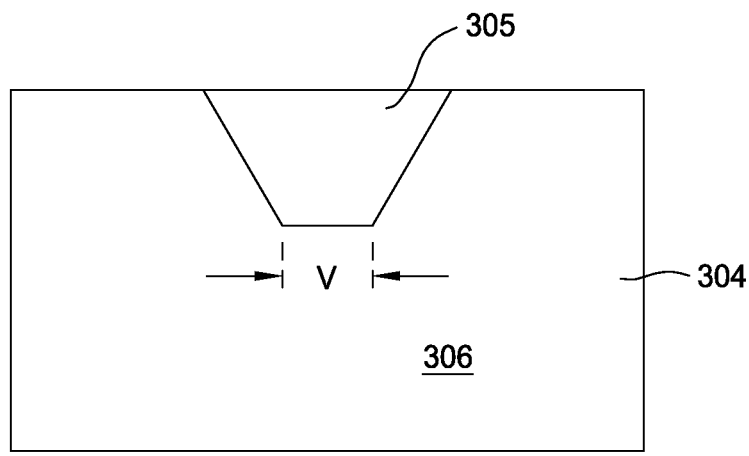
Figure 3E:
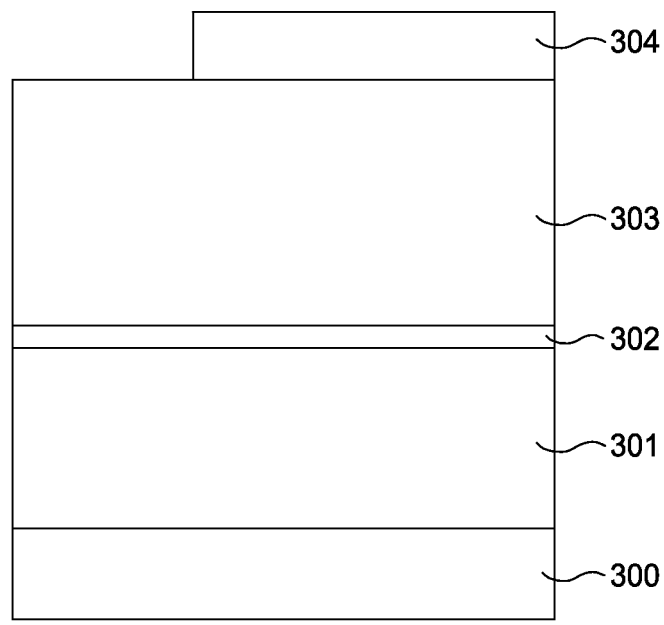
Figure 3F:
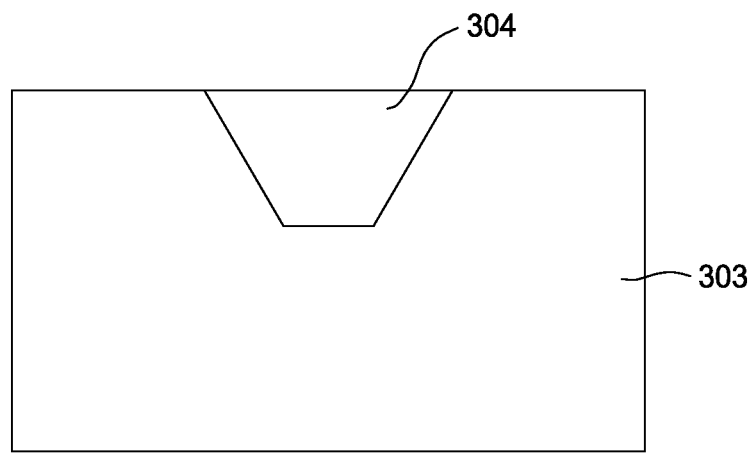
Figure 3G:
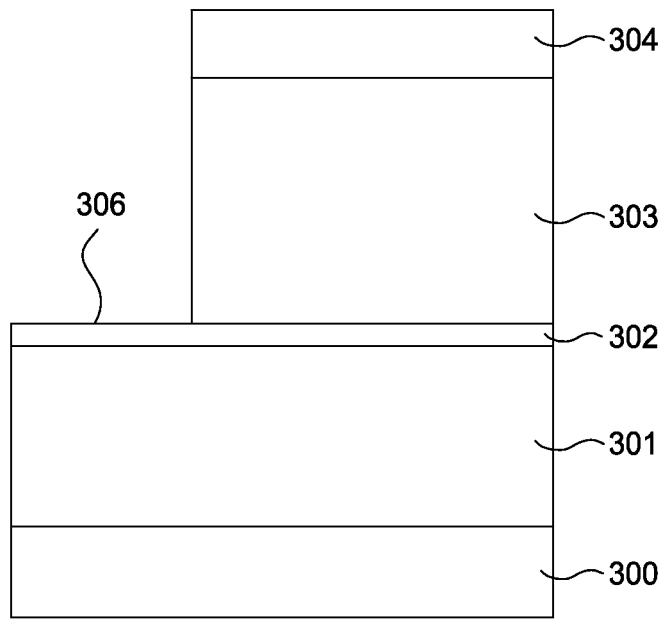
Figure 3H:
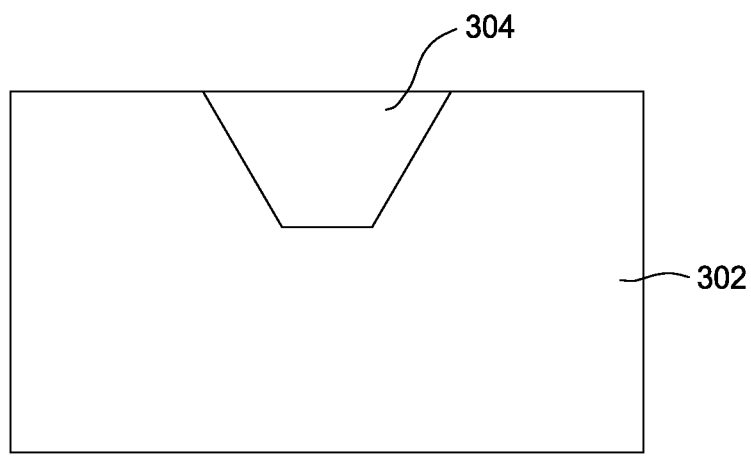
Figure 3:
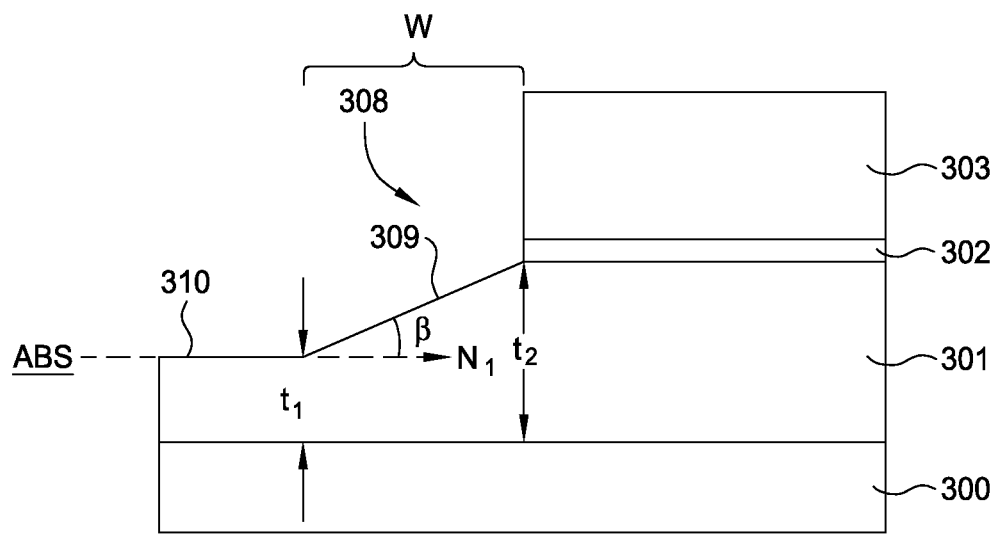
Figure 3J:
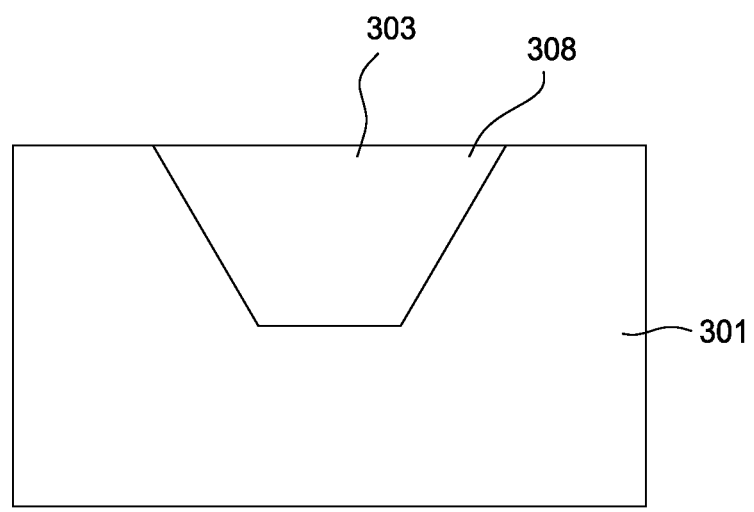
Figure 3K:
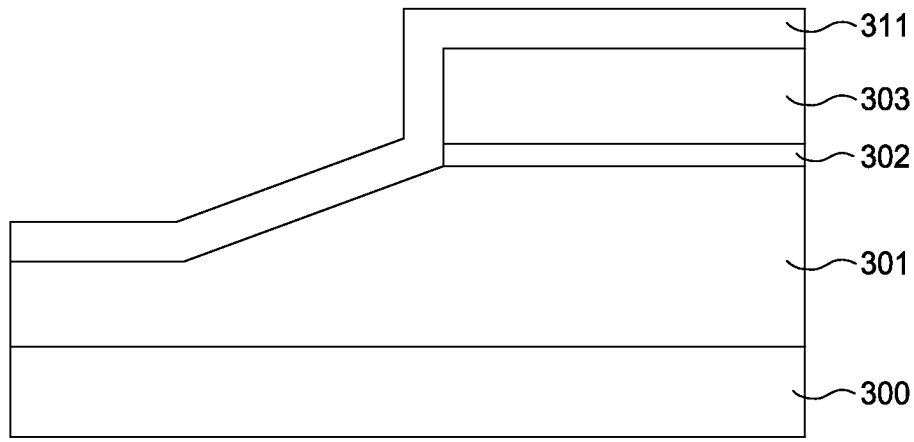
Figure 3L:
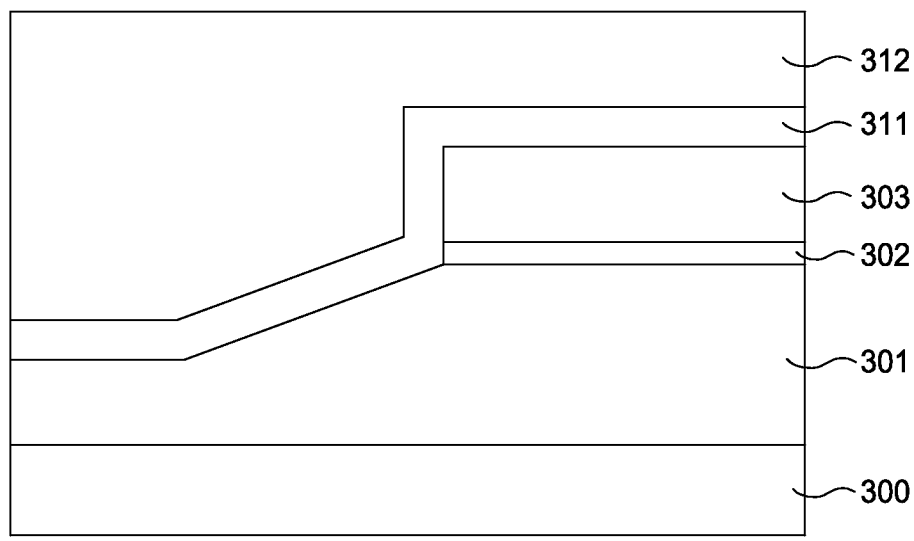
Figure 3M:
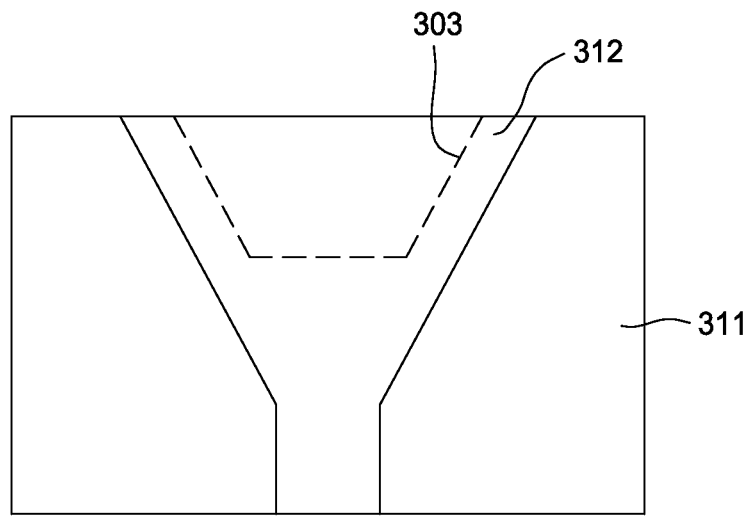
Figure 3N:
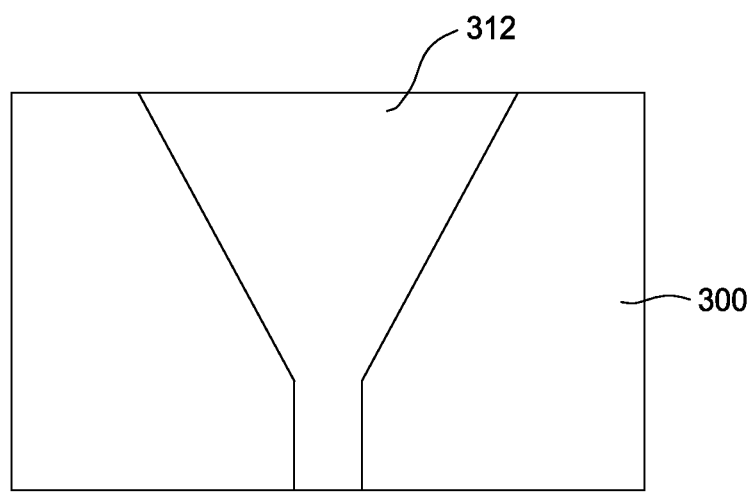
Figure 3:
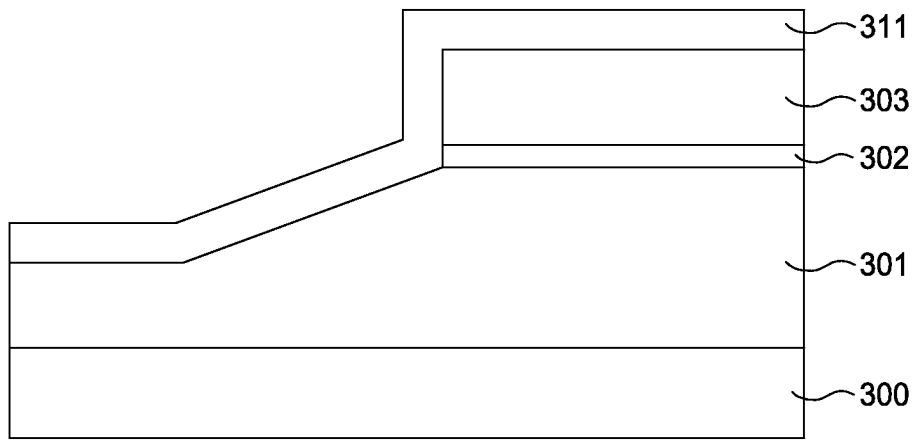
Figure 3P:
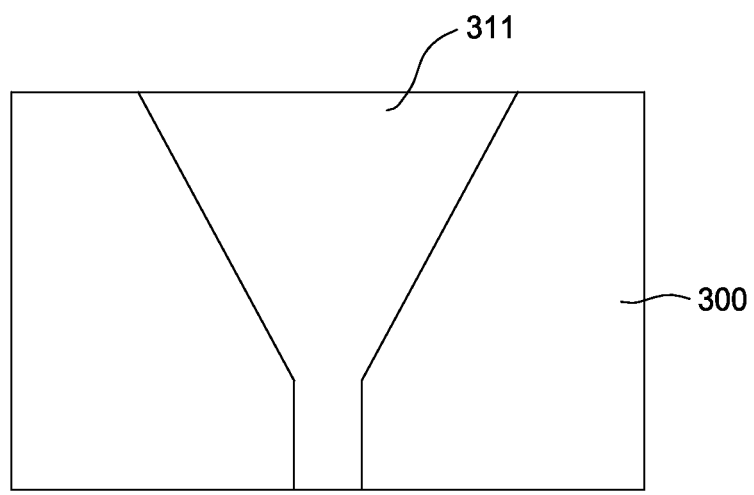
Figure 3Q:
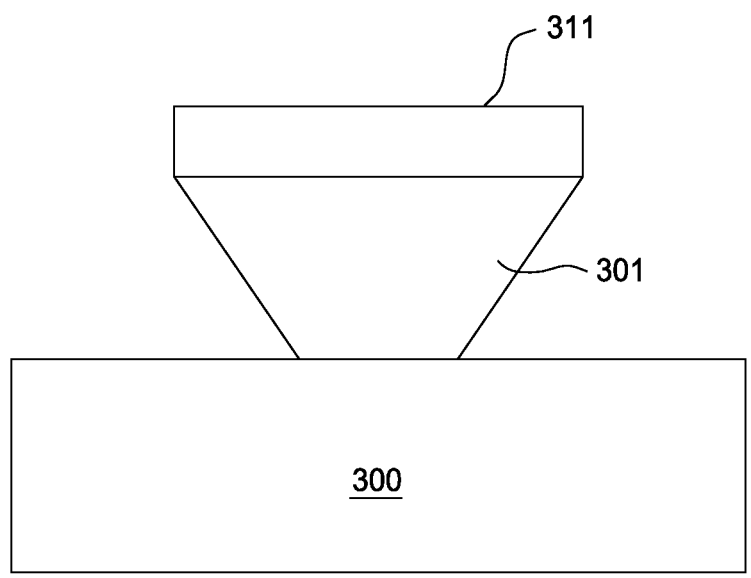

FIGS. 3A-Q illustrates exemplary steps performed during fabrication of a write pole and a portion of a gap layer, e.g. the write pole 220 and gap layer 256 of FIG. 2A, according to an embodiment of the invention. As illustrated in FIG. 3A, in one embodiment, fabrication of a write pole may begin by providing a substrate 300 on which a laminate layer 301 and a Reactive Ion Etching (RIE) stop layer 302 have been formed. The substrate 300 may be composed of a non-magnetic material. For example, in one embodiment, the substrate layer 300 may be composed of Aluminum Oxide ($Al_2O_3$). While not shown in the Figures, the substrate 300 may include one or more other components of a magnetic head, e.g., a read head and one or more components of a write head already formed therein.

The laminate layer 301 may be composed of one or more ferromagnetic materials, for example, Cobalt-Iron (CoFe), Cobalt-Nickel-Iron (CoNiFe), and Nickel-Iron (NiFe), or the like. In one embodiment, the laminate layer 301 may have a thickness between around 250 nm and 350 nm. A write pole may be formed with the laminate layer 301 using the method described below.

The RIE stop layer 302 may be composed of a material that does not react with ions in a RIE process. Exemplary materials that may be used to form the RIE stop layer 302 include Chromium (Cr), Nickel-Chromium (NiCr), or the like. In one embodiment of the invention, the RIE stop layer 302 may have a thickness of around 3 nm to around 15 nm. The laminate layer 301 and the RIE stop layer 302 may be formed on the substrate 300 using any conventional deposition technique, for example, sputter deposition, chemical vapor deposition, electroplating, and the like.

In one embodiment of the invention, a non magnetic layer 303 and a metal layer 304 may be deposited on the RIE stop layer 302, as illustrated in FIG. 3B. In one embodiment of the invention, the non-magnetic layer 303 may be formed with Silicon Carbide (SiC). Alternatively, the non-magnetic layer 303 may be formed with Aluminum Oxide ($Al_2O_3$), Tantalum (Ta), Tantalum Oxide (TaO), Diamond-like Carbon (DLC), Silicon dioxide ($SiO_2$), Silicon Nitride (SiN), or the like. In one embodiment of the invention, the non-magnetic layer 303 may have a thickness of around 200 nm to around 500 nm.

In one embodiment, the combination of the non-magnetic layer 303 and the RIE stop layer 302 may form a part of a gap layer, e.g., the gap layer 256 of FIG. 2A. Specifically, the non-magnetic layer 303 and the RIE stop layer may form a top bump layer that provides separation between a shield layer and the magnetic pole formed with the laminate layer 301. Specifically, the top bump layer may be formed over a flared portion of the write pole. The metal layer 304 may be formed with Chromium, and may have a thickness of around 20 nm to around 50 nm, in one embodiment.

A resist mask 305 may be patterned on the metal layer 304, as illustrated in FIG. 3C. As further illustrated in FIG. 3C, the resist mask may expose a surface 306 of the metal layer 304. In one embodiment, the resist mask 305 may be composed of 193 resist, and may have a thickness of around 0.4 μm. FIG. 3D is a top view of the structure illustrated in FIG. 3C. As shown in FIG. 3D, the resist mask 305 may have a flared shape, which may correspond to the flared shape of a write pole that is being fabricated. As further illustrated, the resist mask 305 may have a minimum width V between around 0.2 μm and 0.4 μm.

In one embodiment, the metal layer surface 306 that is exposed by the resist mask 305 may be removed in an ion milling process. Thereafter, the resist mask 305 may be stripped. The resulting structure is illustrated in FIG. 3E. As illustrated in FIG. 3E, a portion of the non-magnetic layer 303 may be exposed as a result of the ion milling. The portion of the metal layer 304 that was covered by the resist mask 305 still remains. FIG. 3F illustrates a top view of the structure after the milling step. As illustrated in FIG. 3F, the flared shape of the resist mask 305 (See FIG. 3D) may be transferred to the metal layer 304. Furthermore, the non-magnetic layer 303 is exposed as a result of the ion milling.

In one embodiment, the patterned metal layer 304 may be used as a mask, and the pattern thereof may be transferred to the non-magnetic layer 303 in a Reactive Ion Etching (RIE) process. FIG. 3G illustrates the structure after the RIE process. As illustrated, the RIE process may remove portions of the non-magnetic layer 303 that are not covered by the patterned metal layer 304, thereby exposing a surface 306 of the RIE stop layer 302. FIG. 3H illustrates a top view of the structure after the RIE process. As illustrated in FIG. 3H, the RIE process may expose a surface 306 of the RIE stop layer 302.

After the RIE process, the structure may be exposed to an ion milling process to form a tapered region in the laminate layer 301. FIG. 3I illustrates a tapered region 308 that may be formed in the laminate layer 301 as a result of the ion milling. As illustrated in FIG. 3I, the tapered region may have a minimum thickness t1 proximate to an Air Bearing Surface (ABS) end, and a maximum thickness t2. The minimum thickness t2 may be around 150 nm in one embodiment. The thickness t2 may be between around 250 nm and 350 nm. The tapered region may also include a tapered surface 309, which may have an angle β with respect to a direction normal N1 to the ABS end. In one embodiment, the angle β may be between around 30 degrees and 40 degrees. The width W of the tapered region may be around 200 nm in one embodiment.

As illustrated in FIG. 3I, the RIE step may also result in a surface 310 that is substantially normal to the ABS end. As further illustrated in FIG. 3I, the ion milling process may remove the metal layer 304 and expose portions of the non-magnetic layer 303. The RIE process may also reduce the thickness of the non-magnetic layer 303, in some embodiments. FIG. 3J illustrates a top view of the structure after the ion milling process. As illustrated in FIG. 3J, the ion milling process exposes the laminate layer 301 and the patterned non-magnetic layer 303.

In one embodiment, a hard mask layer 311 may be deposited on the structure after the ion milling process. FIG. 3K illustrates the structure after deposition of the hard mask layer 311. The hard mask layer may be formed with Aluminum Oxide, Tantalum, or the like. The hard mask layer may be a single layer or may include multiple layers of the aforementioned materials. In one embodiment, the hard mask layer may have a thickness between around 30 nm and 80 nm. In one embodiment, the hard mask layer 311 may completely cover exposed surfaces of the laminate layer 301 and the non-magnetic layer 303.

A resist mask 312 may be patterned on the hard mask layer 311, as illustrated in FIG. 3L. FIG. 3M illustrates a top view of the structure after deposition of the resist mask. As illustrated in FIG. 3M, the resist mask may have a flared pattern that may correspond to the flared pattern of the write pole 220 illustrated in FIG. 2B. Furthermore, the resist mask 312 may completely cover portions of the structure comprising the non-magnetic layer 303, as illustrated in FIG. 3M.

In one embodiment, the resist 312 may be used as a mask in an ion milling process to remove portions of the hard mask layer 311 and the laminate layer 301. FIG. 3N illustrates a top view of the structure after the ion milling process. As illustrated in FIG. 3N, the ion milling process may remove portions of the hard mask layer 311 and laminate layer 301 that are not under the resist mask 312, thereby exposing the substrate 300. After the ion milling process, the resist mask 312 may be stripped.

FIG. 3O illustrates a transverse view of the structure after the ion milling process. As illustrated in FIG. 3O, the structure may include the laminate layer 301 with the tapered region 308 formed on the substrate 300. The structure may also include the RIE stop layer 302 and a non-magnetic layer 303 formed on a portion of the laminate layer 301. Furthermore, a hard mask layer 311 may be formed over surfaces of the laminate layer 301, the non magnetic layer 303, and sidewall portions of the RIE stop layer 302 and the non magnetic layer 303, as illustrated in FIG. 3O.

FIG. 3P illustrates a top view of the structure after stripping of the resist mask 312. As illustrated in FIG. 3P, the structure may include hard mask layer 311 formed in the shape of a tapered write pole. The laminate layer 301 under the hard mask layer may be an example of a write pole, e.g., the write pole 220 described hereinabove with reference to FIGS. 2A and 2B. FIG. 3P illustrates an ABS view of the structure. As illustrated in FIG. 3Q, the laminate layer (write pole) may include a substantially trapezoidal shape at the ABS. Also illustrated in FIG. 3Q is the hard mask layer 311 and the substrate 300 which are adjacent to the top and bottom surfaces respectively of the laminate layer 301.

After forming a write pole using the process described hereinabove with respect to FIGS. 3A-Q, one or more further processing steps may be performed to fabricate further portions of the gap layer, e.g., the gap layer 256 illustrated in FIG. 2A. FIGS. 4A-H illustrate an exemplary method for fabricating the further portions of the gap layer, e.g., a front bump, according to an embodiment of the invention. The front bump may refer to a portion of the gap layer that is formed over a tapered region and portions of the pole tip region of the write pole.

Figure 4A:
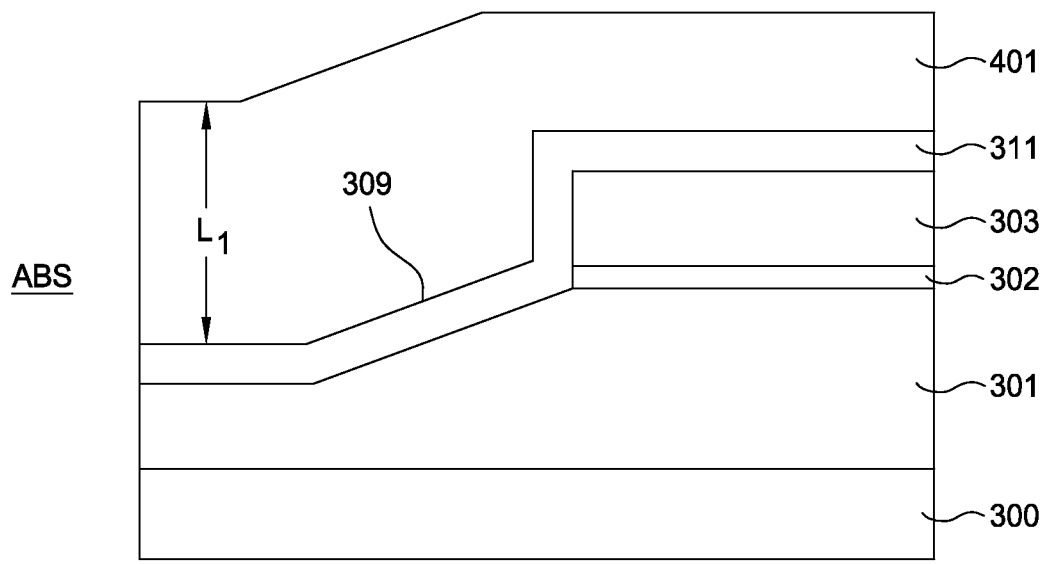
FIGS. 4A-H illustrate an exemplary method for forming a gap layer on the write pole, according to an embodiment of the invention.

In one embodiment, fabrication of the gap layer may begin by depositing a non-magnetic layer on the structure formed using the process of FIGS. 3A-Q. FIG. 4A illustrates a non-magnetic layer 401 that is deposited on a write pole structure comprising the write pole 301, a hard mask layer 311, RIE stop layer 302, non-magnetic layer 303, and a substrate 300. The non-magnetic layer 401 may be made from any suitable material including, for example, Tantalum (Ta), Tantalum Oxide (TaO), Ruthenium (Ru), Nickel-Chromium (NiCr), Silicon Carbide (SiC) or Aluminum Oxide ($Al_2O_3$), or the like. In a particular embodiment, the thickness it of the non-magnetic layer 401 may be around 200 nm.

Figure 4B:
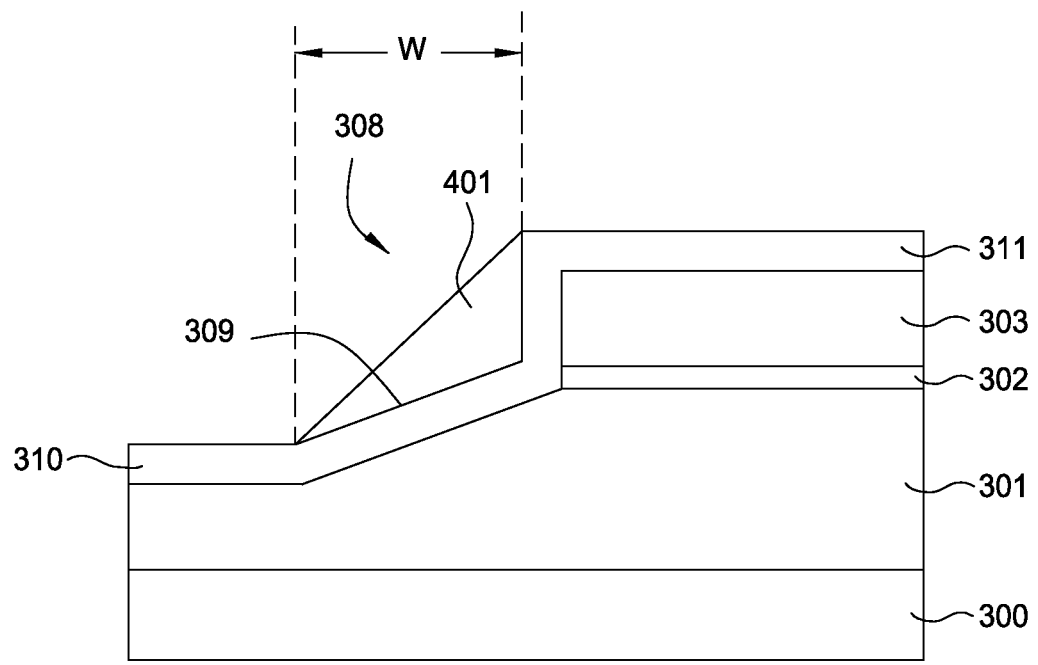

In one embodiment, after deposition of the non-magnetic layer 401, a reactive ion etching (RIE) or an ion milling step may be performed to remove excess portions of the non-magnetic layer 401. FIG. 4B illustrates the non-magnetic layer 401 after the ion milling process. As illustrated in FIG. 4B, after the ion milling, portions of the non-magnetic layer 401 remain over the tapered surface 309 in the tapered region 308 of the magnetic pole 301. In one embodiment, the width W of the region including the tapered surface and the non-magnetic layer 401 formed thereon may be around 200 nm.

Figure 4C:
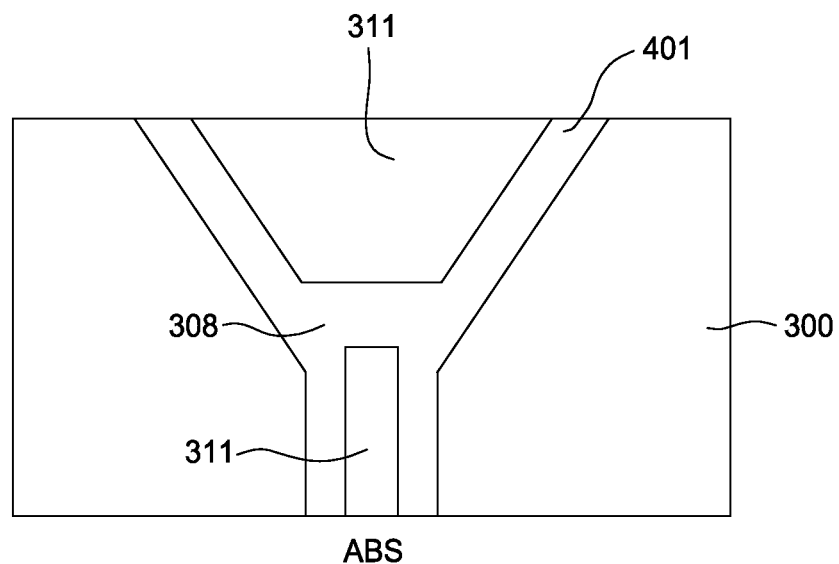
Figure 4D:
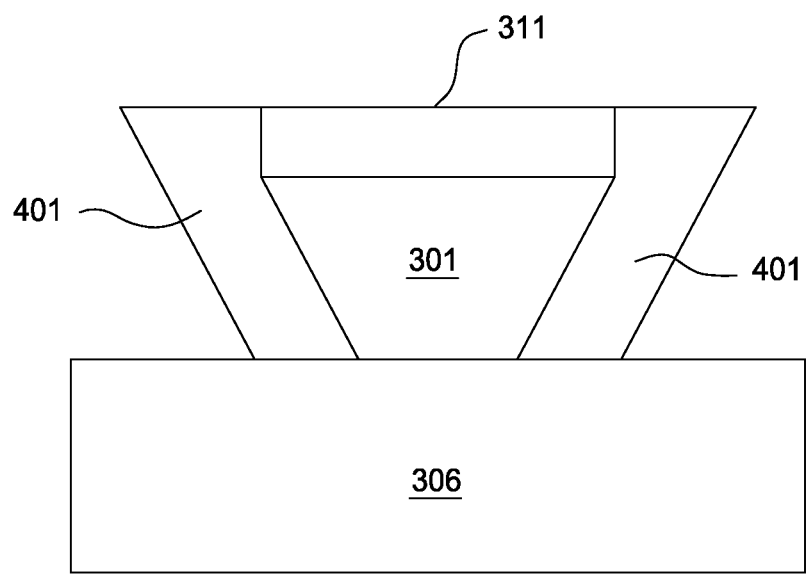

FIG. 4C illustrates a top view of the structure after the ion milling process. As illustrated in FIG. 4C, portions of the non-magnetic layer 401 may remain along sidewall portions of the magnetic pole 301 and the hard mask layer 311. FIG. 4D illustrates an ABS view of the structure, which further illustrates remaining portions of the non-magnetic layer 401 formed along sidewall portions of the magnetic pole 301 and the hard mask layer 311.

Figure 4E:
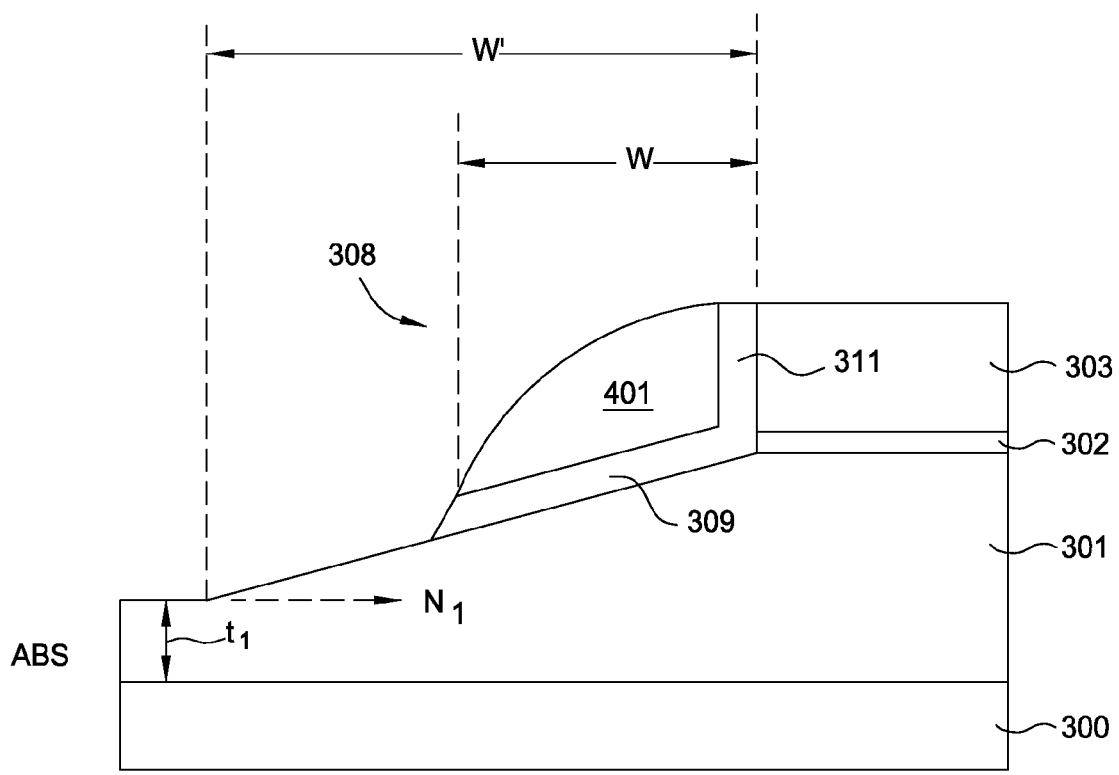

In one embodiment, a further ion milling or RIE step may be performed to remove exposed portions of the hard mask layer 311. FIG. 4E illustrates the structure after the further ion milling process, according to an embodiment of the invention. As illustrated in FIG. 4E, the ion milling process removes the portions of the hard mask layer 311 that are not under the non-magnetic layer 401, and exposes the magnetic pole 301 and the non-magnetic layer 303. The ion milling process may also remove portions of the non-magnetic layer 401, and any portion of the hard mask layer that is exposed as a result of the removal of portions of the non-magnetic layer 401, as illustrated in FIG. 4E.

Furthermore, the further ion milling process may remove portions of the magnetic pole 301, thereby extending the width of the tapered region. For example, in one embodiment, the further ion milling may extend the width of the tapered region by around 50 nm. FIG. 4E illustrates an extension of the width of the tapered region from a first width W to a second larger width W', according to an embodiment of the invention. In one embodiment, the first width W is around 200 nm, and the second width W' is around 300 nm.

While the tapered surface 309 of the write pole 301 is shown having a straight surface, in other embodiments, the tapered region may include a plurality of straight surfaces with different taper angles with respect to a normal N1 to the ABS. For example, the further extended portion of the tapered region may have a taper angle between around 25 degrees and 35 degrees. However, as indicated hereinabove with respect to FIG. 3I, the tapered region may have originally been formed with a taper angle between around 30 degrees and 40 degrees. The removal of portions of the write pole may also reduce the minimum thickness of the write pole 301 near the ABS, in one embodiment.

Figure 4F:
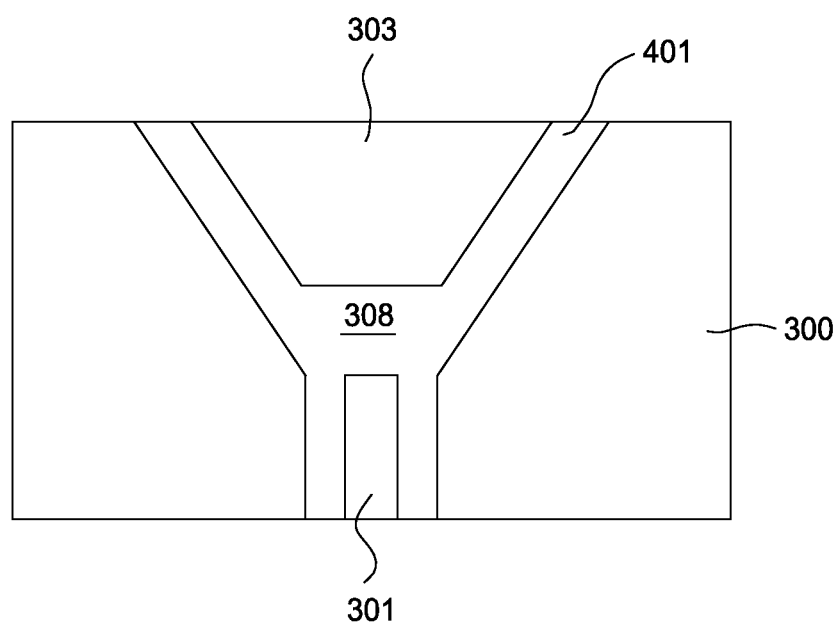

FIG. 4F illustrates a top view of the structure after the further ion milling step. As illustrated in FIG. 4F, the further ion milling exposes the non-magnetic layer 303 and the magnetic pole 301. As further illustrated, the non-magnetic layer 401 may remain over the tapered region 308 and the sidewall portions of the magnetic pole 301.

Figure 4G:
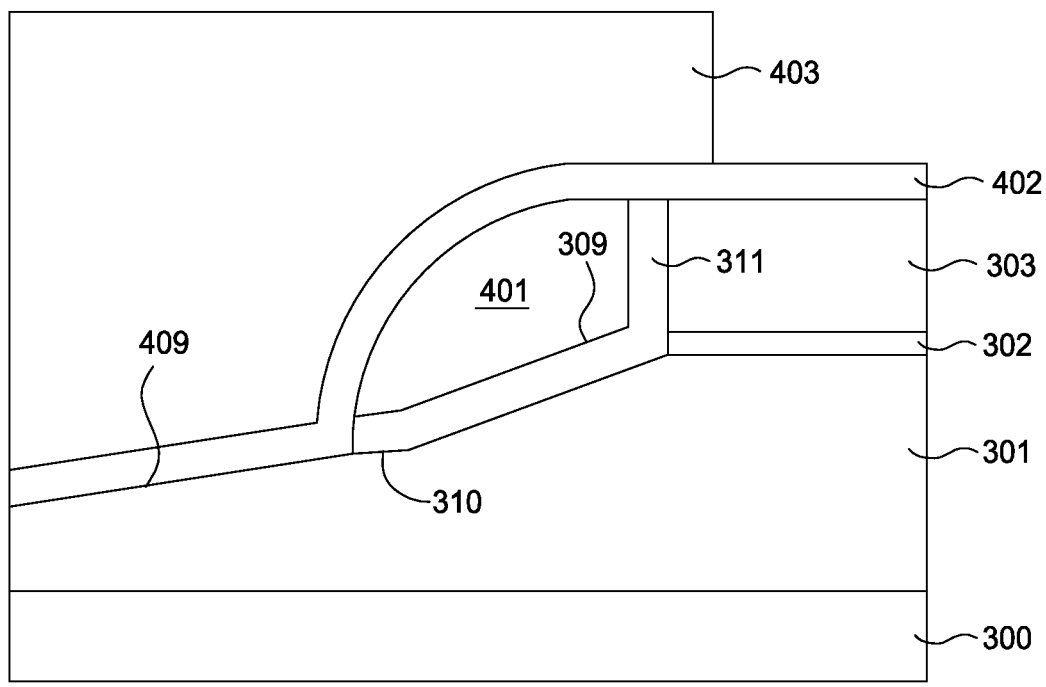
Figure 4H:
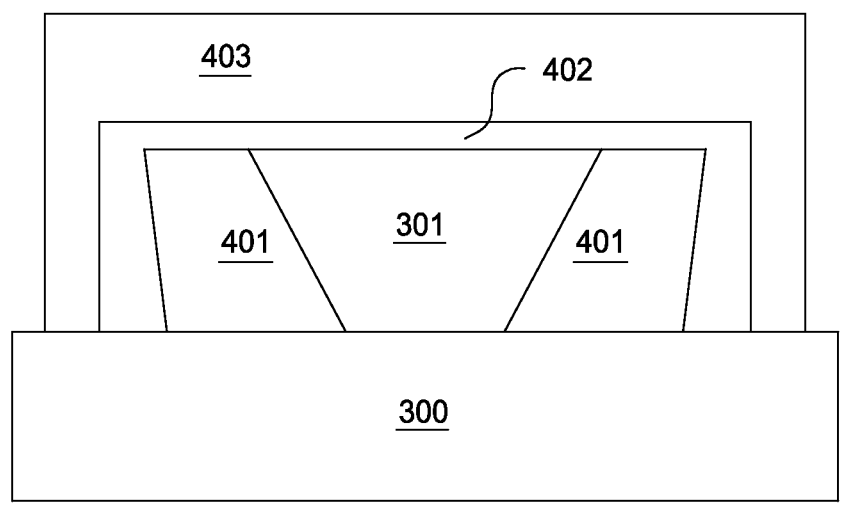

In one embodiment, after the further ion milling step, another non-magnetic layer 402 may be deposited over the structure, and a shield layer 403 may be patterned thereon. FIG. 4G illustrates a non-magnetic layer 402 that is deposited over the structure. The non-magnetic layer 402 may insulate the magnetic pole 301 from the shield layer 403. FIG. 4H is an ABS view of the exemplary structure according to an embodiment of the invention illustrating the magnetic pole 301 wherein sidewall portions of the magnetic pole are adjacent to the non-magnetic layer 401. The non-magnetic layer 402 is formed over the magnetic pole 301, along the top and sidewall surfaces of the non-magnetic layer 401. A wrap around shield layer 403 is also shown formed along the top and sidewall surfaces of the non-magnetic layer 402. The combination of the non-magnetic layers 303, 401, and 402, the RIE stop layer 302, and the hard mask layer 311 may correspond to the non-magnetic gap layer 256 illustrated in FIG. 2A.

The non-magnetic layer 401 may provide further separation between the shield layer 403 and the tapered surface 309 of the write pole 301. Reduced separation between the write pole 301 and the shield layer 403 near the ABS results in an improved write field gradient which, in turn, results in a lower bit error rate during write operations of the write head.

Figure 5A:
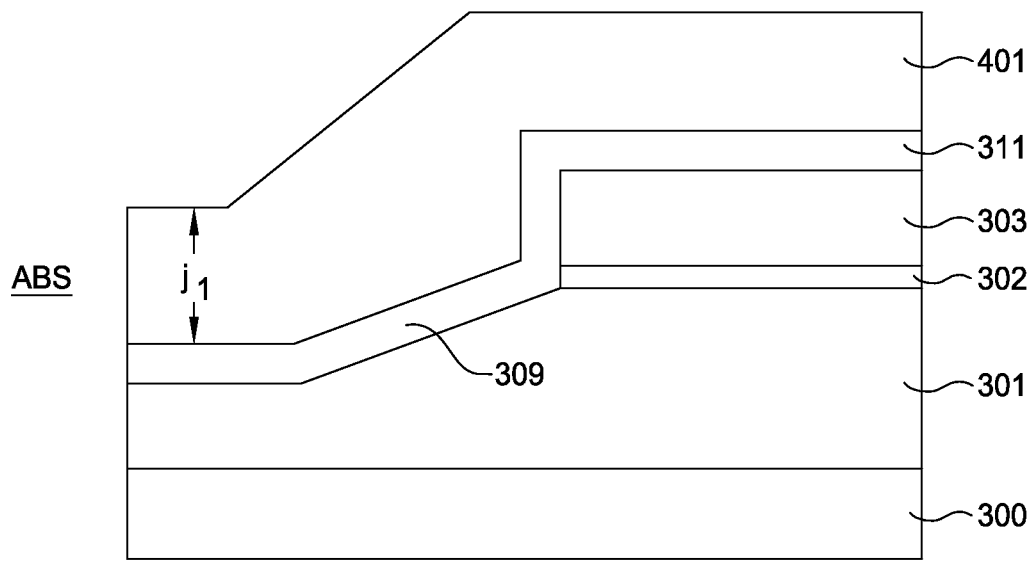
FIGS. 5A-G illustrate another exemplary method for forming a gap layer on the write pole, according to an embodiment of the invention.

FIGS. 5A-G illustrate another exemplary method for forming a gap layer, according to an embodiment of the invention. Fabrication of the gap layer may begin by depositing a non-magnetic layer on the structure formed using the process of FIGS. 3A-Q. FIG. 5A illustrates a non-magnetic layer 501 that is deposited on a write pole structure comprising the write pole 301, a hard mask layer 311, RIE stop layer 302, non-magnetic layer 303, and a substrate 300. The non-magnetic layer 501 may be made from any suitable material including, for example, Tantalum (Ta), Tantalum Oxide (TaO), Ruthenium (Ru), Nickel-Chromium (NiCr), Silicon Carbide (SiC) or Aluminum Oxide ($Al_2O_3$), or the like. In a particular embodiment, the thickness j1 of the non-magnetic layer 401 may be between around 40 nm and 150 nm.

Figure 5B:
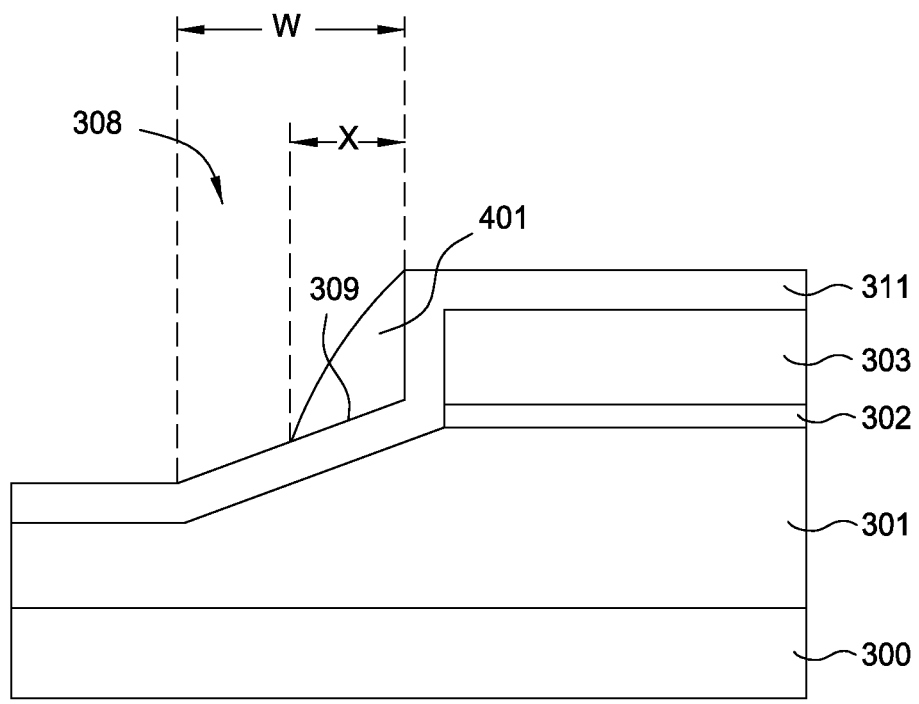

In one embodiment, after deposition of the non-magnetic layer 501, an ion milling step may be performed to remove excess portions of the non-magnetic layer 501. FIG. 5B illustrates the non-magnetic layer 501 after the ion milling process. As illustrated in FIG. 5B, after the ion milling, portions of the non-magnetic layer 501 remain over a part of the tapered surface 309 in the tapered region 308 of the magnetic pole 301. In one embodiment, the width W of the region including the tapered surface and the non-magnetic layer 501 formed thereon may be around 200 nm. The width X of the region comprising the non-magnetic layer 501 may be between around 40 nm and 150 nm.

Figure 5C:
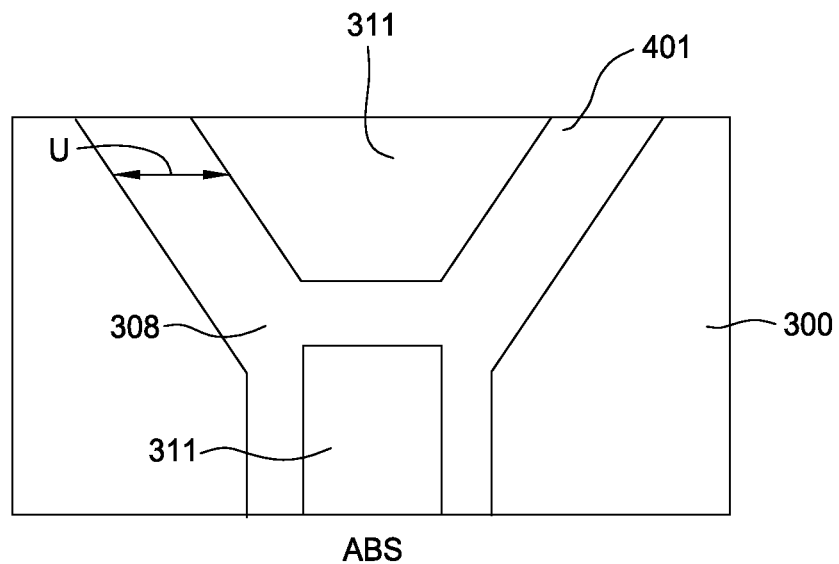
Figure 5D:
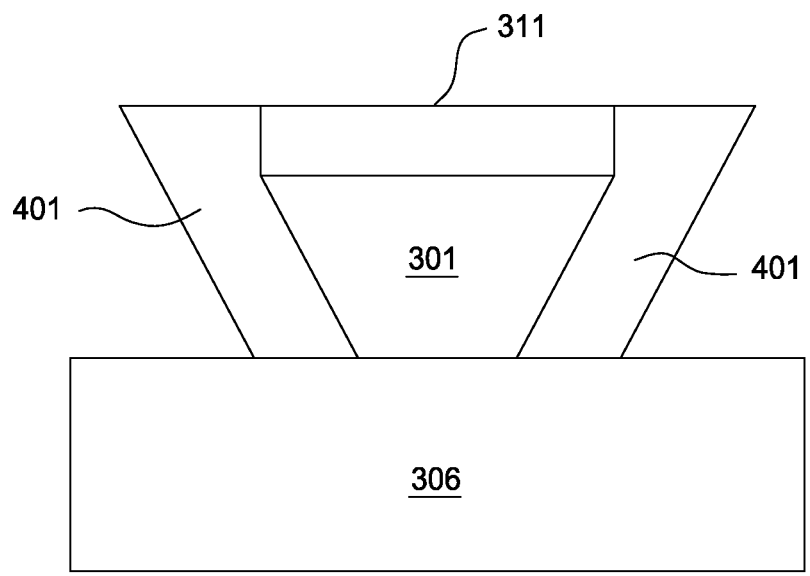

FIG. 5C illustrates a top view of the structure after the ion milling process. As illustrated in FIG. 5C, portions of the non-magnetic layer 501 may also remain along sidewall portions of the magnetic pole 301 and the hard mask layer 311 in addition to the tapered region 308. FIG. 5D illustrates an ABS view of the structure, which further illustrates remaining portions of the non-magnetic layer 501 formed along sidewall portions of the magnetic pole 301 and the hard mask layer 311.

In contrast to the fabrication steps illustrated in FIGS. 4A-D, the fabrication steps illustrated in FIGS. 5A-D result in a non-magnetic layer being formed only on a portion of the tapered surface 309. In one embodiment, the fabrication steps illustrated in FIGS. 5A-5C may also result in a smaller width U (see FIG. 5C) of the non-magnetic layer along the sidewall portions of the write pole 301, thereby facilitating the fabrication of smaller magnetic heads.

Figure 5E:
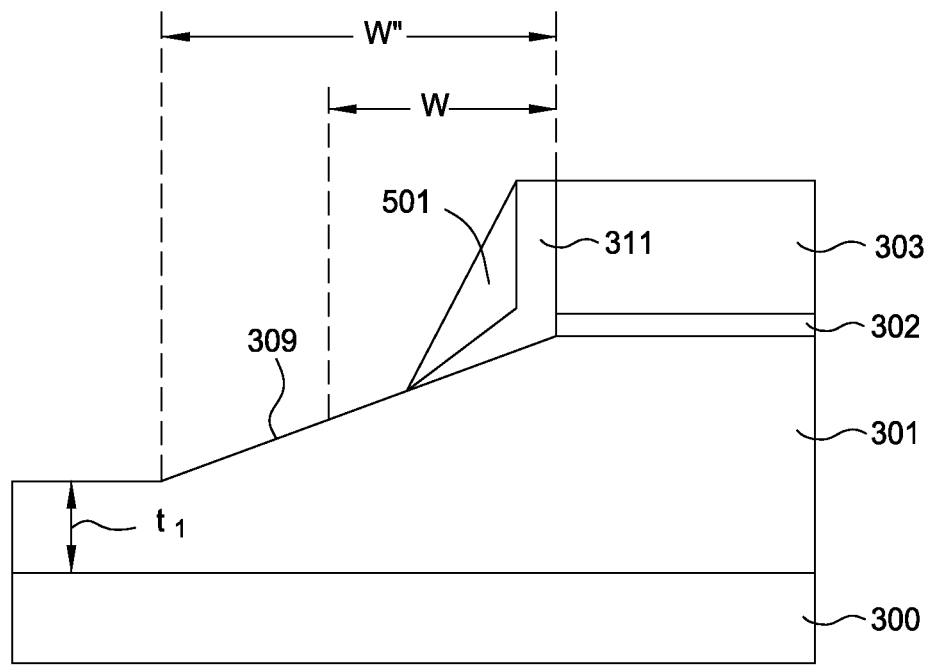

In one embodiment, an ion milling step may be performed to remove exposed portions of the hard mask layer 311 and further extend the tapered region. In one embodiment of the invention, the ion milling step may be a backside static ion milling step. As illustrated in FIG. 5E, the ion milling process removes the portions of the hard mask layer 311 that are not under the non-magnetic layer 401, and exposes the magnetic pole 301 and the non-magnetic layer 303. The ion milling process may also remove portions of the non-magnetic layer 501, and any portion of the hard mask layer that is exposed as a result of the removal of portions of the non-magnetic layer 501, as illustrated in FIG. 5E.

Furthermore, the further ion milling process may remove portions of the magnetic pole 301, thereby extending the width of the tapered region. For example, in one embodiment, the further ion milling may extend the width of the tapered region by around 50 nm. FIG. 5E illustrates an extension of the width of the tapered region from a first width W to a second larger width W'', according to an embodiment of the invention. In one embodiment the first width W may be around 200 nm, and the second width W'' may be around 300 nm.

While the tapered surface 309 of the write pole 301 is shown having a straight surface, in other embodiments, the tapered region may include a plurality of straight surfaces with different taper angles with respect to a normal N1 to the ABS. For example, the further extended portion of the tapered region may have a taper angle between around 25 degrees and 35 degrees. However, as indicated hereinabove with respect to FIG. 3I, the tapered region may have originally been formed with a taper angle between around 30 degrees and 40 degrees. The removal of portions of the write pole may also reduce the minimum thickness of the write pole 301 near the ABS, in one embodiment.

Figure 5F:
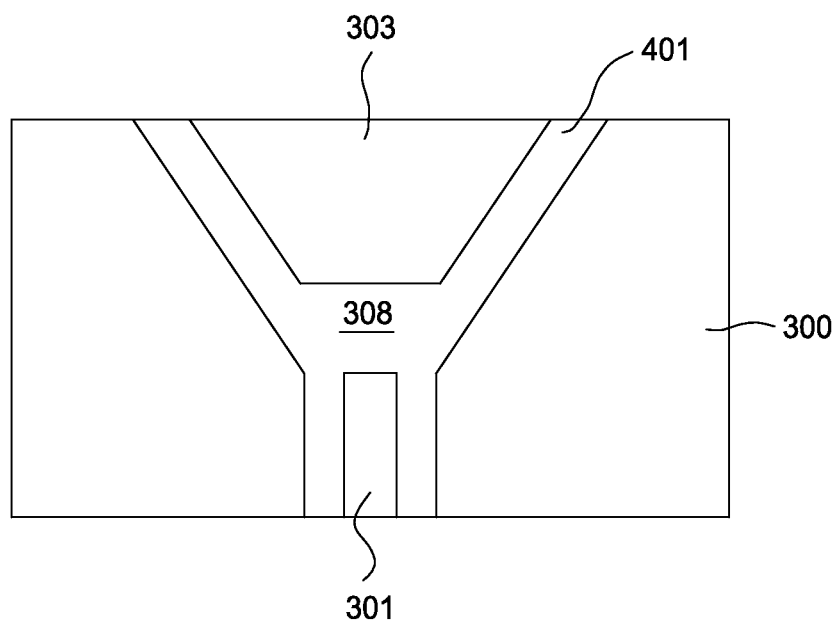

FIG. 5F illustrates a top view of the structure after the further ion milling step. As illustrated in FIG. 5F, the ion milling exposes the non-magnetic layer 303 and the magnetic pole 301. As further illustrated, the non-magnetic layer 501 may remain over the tapered region 308 and the sidewall portions of the magnetic pole 301.

Figure 5G:
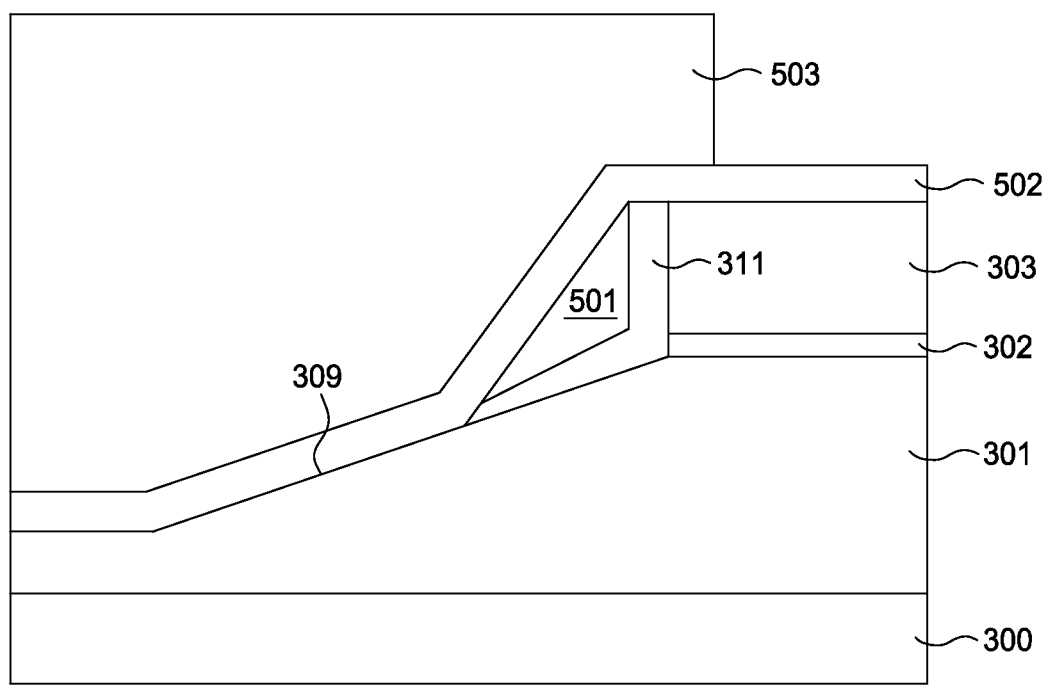

In one embodiment, after the ion milling step, another non-magnetic layer 502 may be deposited over the structure, and a shield layer 503 may be patterned thereon. FIG. 5G illustrates a non-magnetic layer 502 that is deposited over the structure. The non-magnetic layer 502 may insulate the magnetic pole 301 from the shield layer 503. The combination of the non-magnetic layers 303, 501, and 502, the RIE stop layer 302, and the hard mask layer 311 may correspond to the non-magnetic gap layer 256 illustrated in FIG. 2A.

In one embodiment of the invention, one or more layers that form the gap layer 256 may be formed during the fabrication of the magnetic pole. FIGS. 6A-M illustrate exemplary steps for fabricating a magnetic pole and a gap layer, according to an embodiment of the invention. In one embodiment, fabrication of the magnetic pole and the gap layer may begin by providing the structure illustrated in FIG. 3I, comprising a substrate 300 on which a laminate layer 301 with a tapered region 308, a RIE stop layer 302, and a non-magnetic layer 303.

Figure 6A:
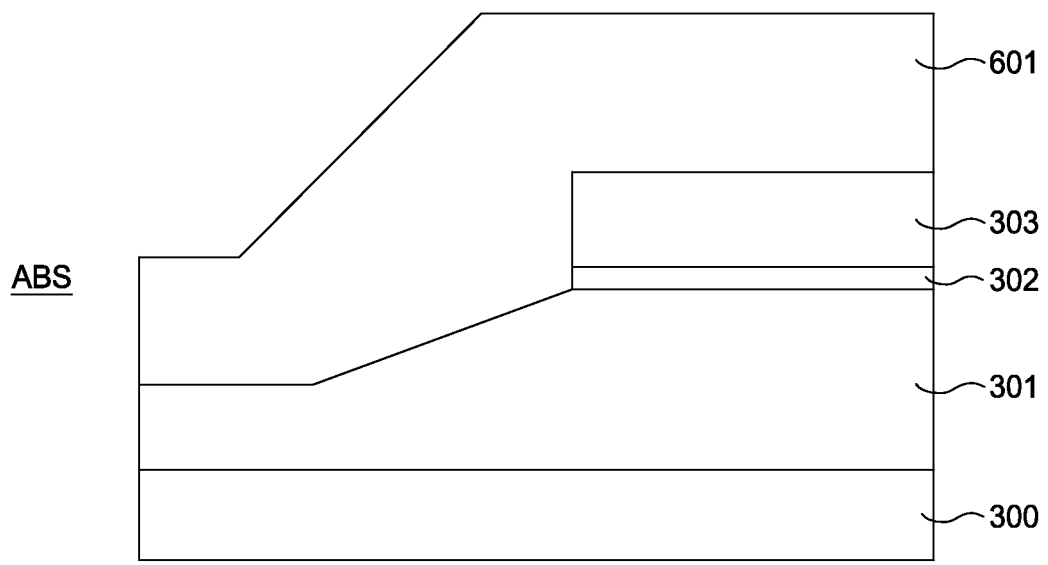
FIGS. 6A-M illustrates a method for forming a write pole and a gap layer, according to an embodiment of the invention.
Figure 6B:
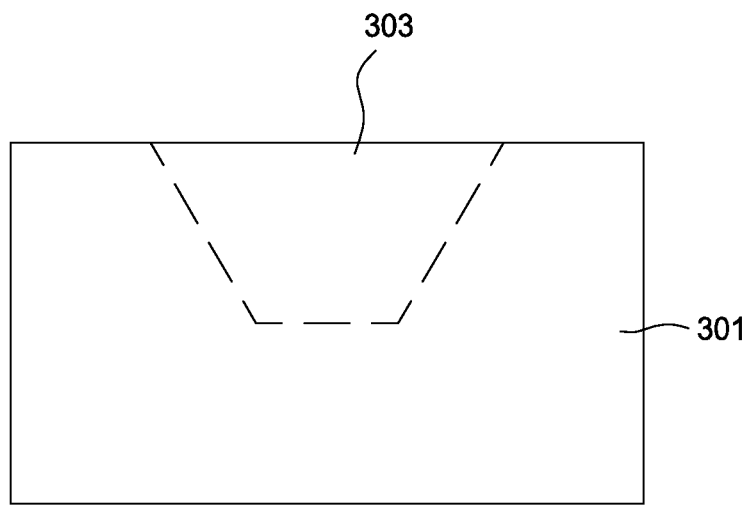

As illustrated in FIG. 6A, a non-magnetic layer 601 may be deposited on the structure. The non-magnetic layer may be formed with any suitable non-magnetic materials, e.g., Alumina, Ruthenium, Carbon, Tantalum, or the like. In one embodiment the thickness of the non-magnetic layer 601 may be between around 40 nm and 150 nm. FIG. 6B illustrates a top view of the structure after deposition of the non-magnetic layer 601. As illustrated in FIG. 6B, the non-magnetic layer 601 may cover both, the laminate layer 301 and the non-magnetic layer 303 (shown with dotted lines in FIG. 6B).

Figure 6C:
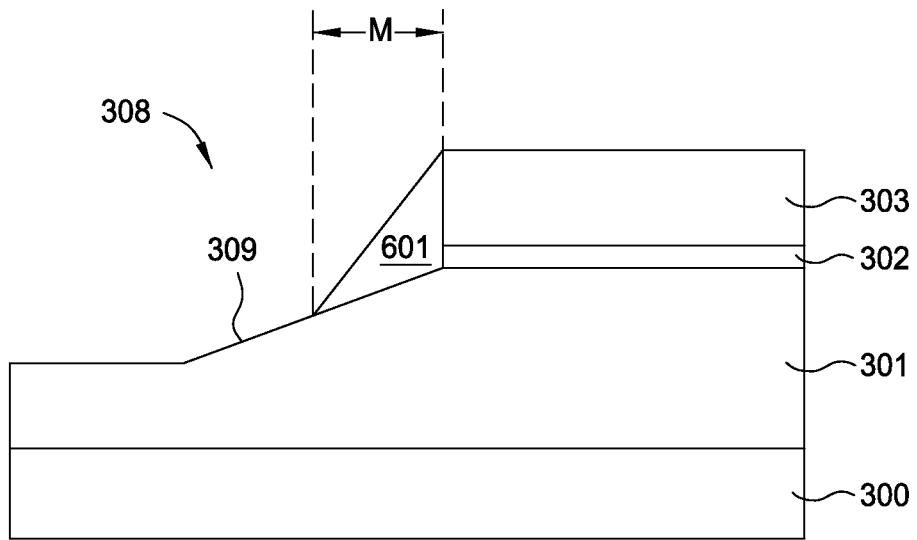

In one embodiment of the invention, an ion milling step may be performed to remove excess portions of the non-magnetic layer 601. FIG. 6C illustrates the structure after the ion milling. As illustrated in FIG. 6C, a portion of the non-magnetic layer 601 may remain over a portion of the tapered surface 309. The remaining portion of the non-magnetic layer 601 may also be adjacent to a sidewall portion of the non-magnetic layer 303. In one embodiment the width M of the remaining portions of the non-magnetic layer 601 may be between around 40 nm and 150 nm.

Figure 6D:
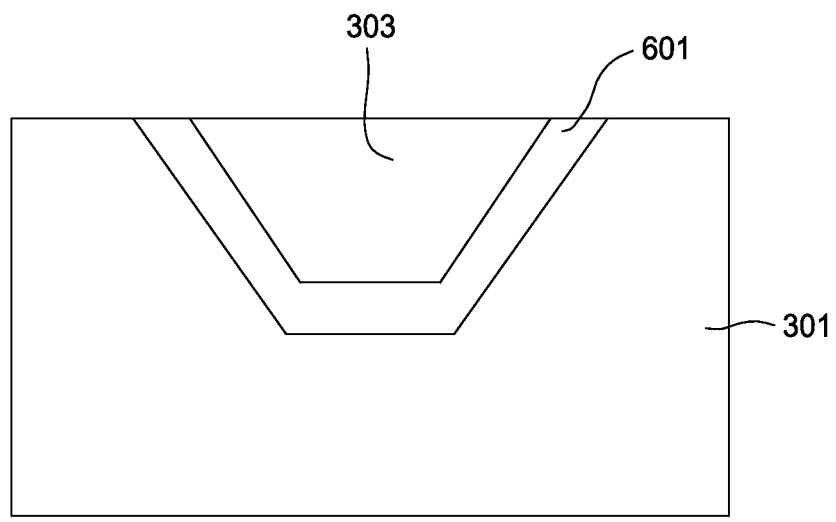

FIG. 6D illustrates a top view of the structure after the ion milling. As illustrated in FIG. 6D, the ion milling exposes surfaces of the laminate layer 301 and the non-magnetic layer 303. FIG. 6D also illustrates that the remaining portions of the non-magnetic layer 601 are formed along sidewall portions of the non-magnetic layer 303.

Figure 6E:
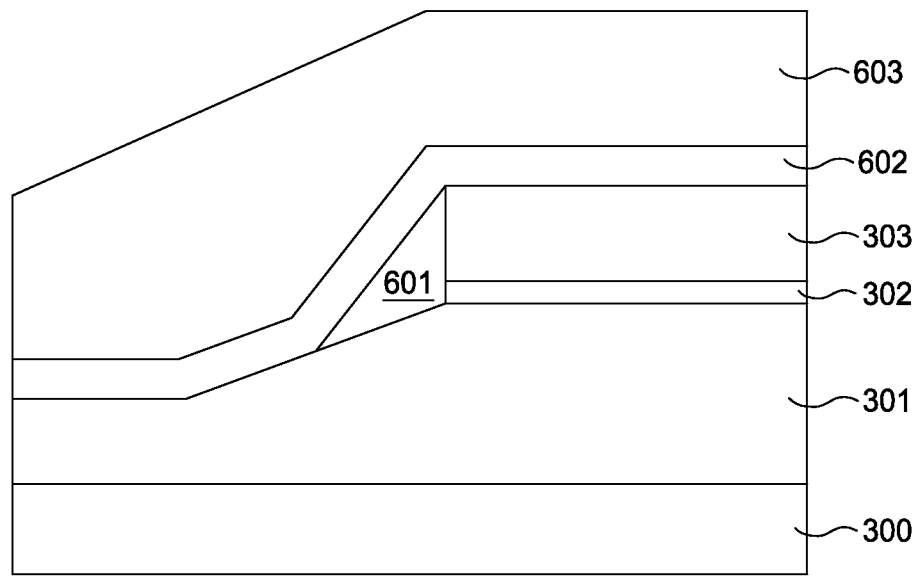
Figure 6F:
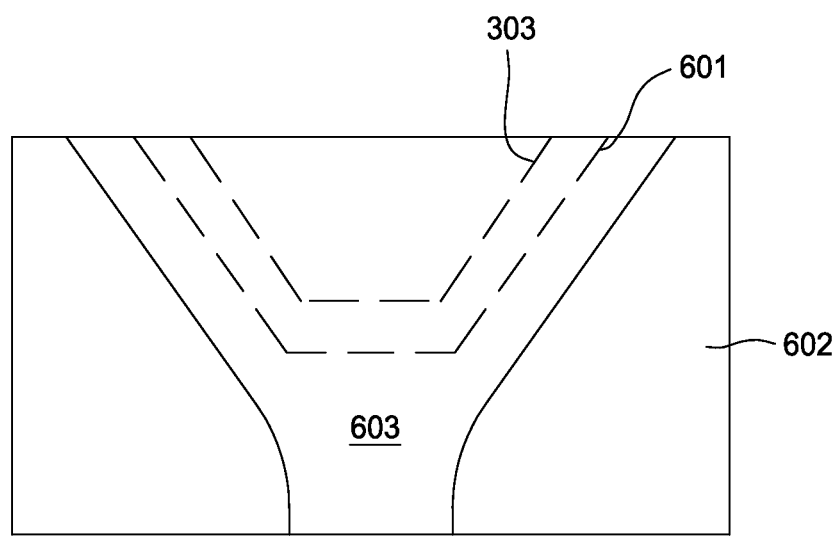

In one embodiment, after forming the non-magnetic layer 601, one or more processing steps for patterning the magnetic pole may continue. For example, in one embodiment a hard mask layer 602 may be deposited on the structure and a resist layer 603 may be patterned thereon, as illustrated in FIG. 6E. The hard mask layer may be formed with Aluminum Oxide, Carbon, Tantalum, or the like, and may have a thickness between around 30 nm and 80 nm. FIG. 6F illustrates a top view of the structure after deposition of the hard mask layer 602 and the resist layer 603. As illustrated in FIG. 6F, the resist layer may be patterned in the shape of a flared write pole such as the flared write pole 220 illustrated in FIG. 2B.

Figure 6G:
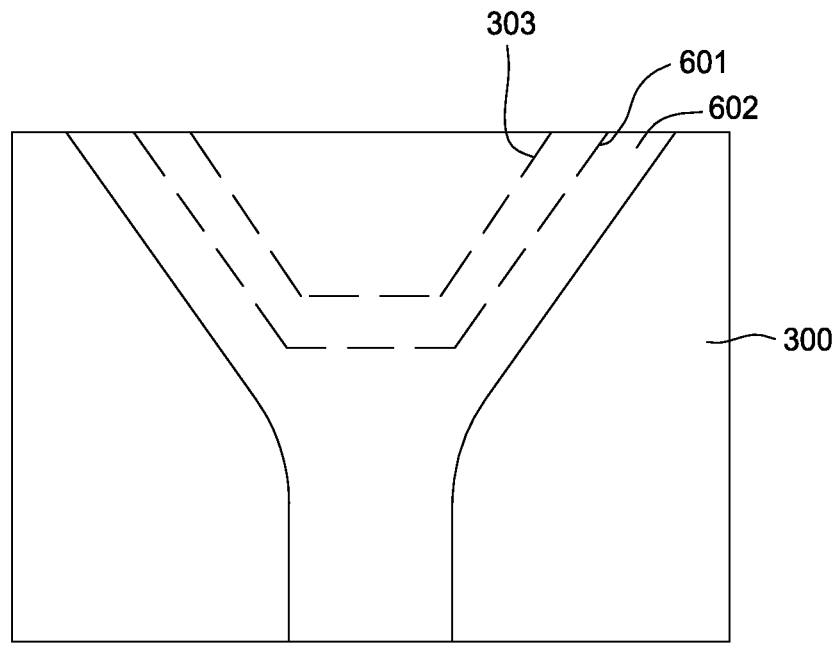
Figure 6H:
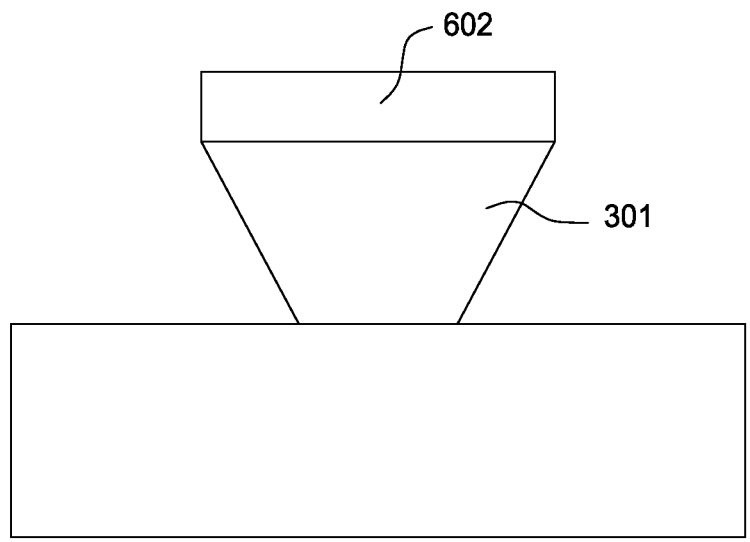

In one embodiment, the pattern of the resist layer 603 may be transferred to the hard mask layer in an ion milling step that removes portions of the hard mask layer 602 and the laminate layer 301 that are not beneath the patterned resist layer 603. Thereafter, the resist layer 603 may be stripped. FIG. 6G illustrates a top view of the structure after the ion milling step and stripping of the resist layer 603. As illustrated in FIG. 6G, the ion milling may result in the hard mask layer 601 and laminate layer 301 receiving the pattern of the resist layer 603, thereby exposing the substrate 300. Also illustrated in FIG. 6G by means of dashed lines are the non-magnetic layer 601 and the non-magnetic layer 303 under the hard mask layer 602. FIG. 6H is an ABS view of the structure after the ion milling and resist layer 603 stripping. As illustrated in FIG. 6H, the laminate layer (or write pole) 301 may have a substantially trapezoidal shape. The hard mask layer 602 is also illustrated on a top surface of the magnetic pole 301.

Figure 6I:
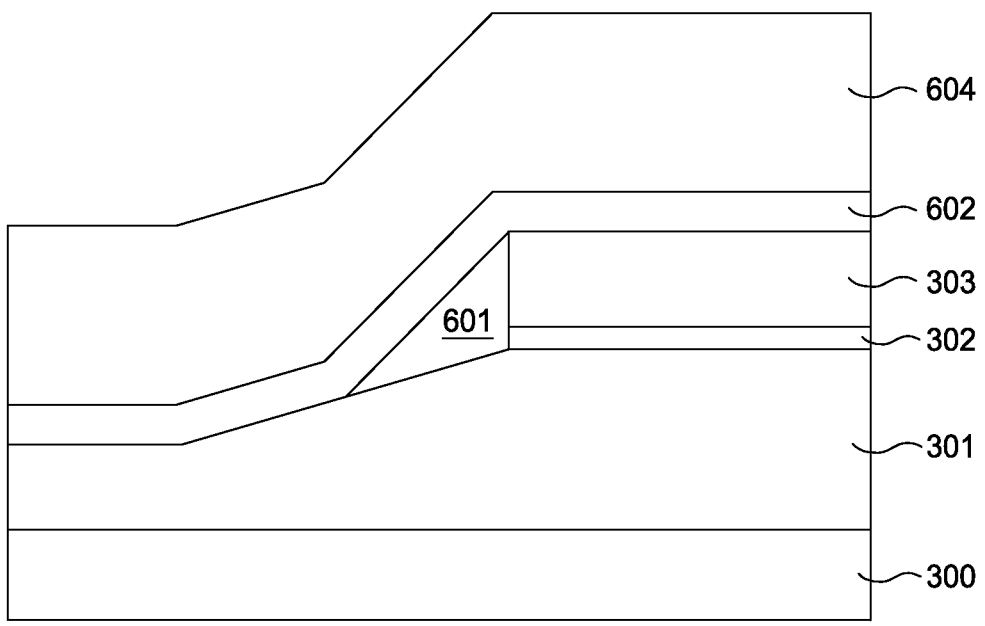

In one embodiment, the ion-milling step may complete the formation of the write pole. However, one or more further processing steps may be performed to complete fabrication of the gap layer. For example, in one embodiment, a non-magnetic layer 604 may be deposited on the structure, as illustrated in FIG. 6I. In one embodiment of the invention, the thickness of the non-magnetic layer 604 may be around 100 nm.

Figure 6J:
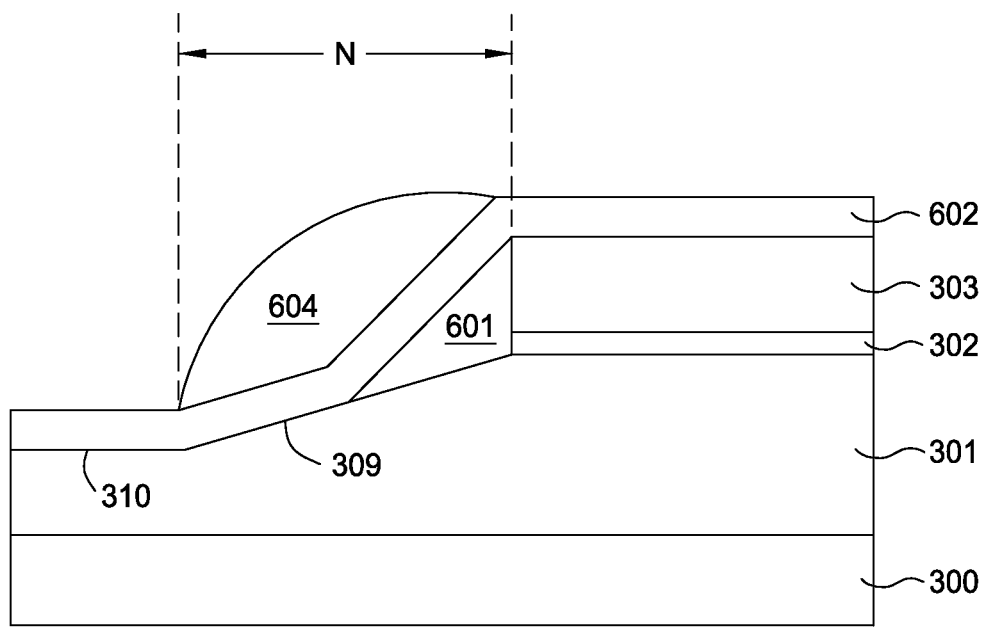

After deposition of the non-magnetic layer 604, an ion milling step may be performed to remove undesired portions of the non-magnetic layer 604. FIG. 6J illustrates the structure after the ion milling step. As illustrated in FIG. 6J, portions of the non-magnetic layer 604 may remain over the tapered surface 309 and at least some of the surface 310 of the magnetic pole 301. In one embodiment, the width N of the non-magnetic layer 604 may be around 200 nm.

Figure 6K:
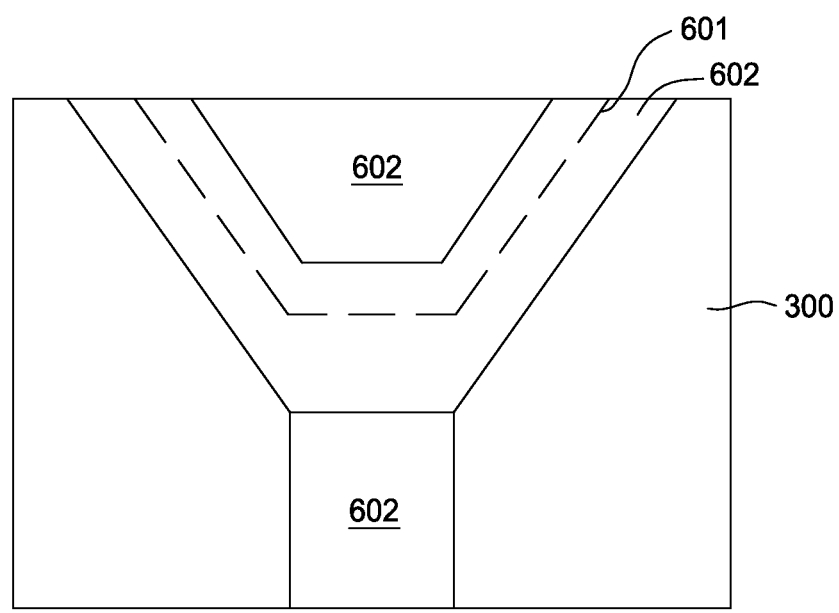

FIG. 6K illustrates a top view of the structure after the ion milling. As illustrated in FIG. 6K, the ion milling may expose portions of the hard mask layer 602, and the substrate 300. FIG. 6K also illustrates portions of the non-magnetic layer 604 that are formed over the tapered region of the write pole 301. Also illustrated in FIG. 6K (using dashed lines) is the non-magnetic layer 601 that is under the non-magnetic layer 604.

Figure 6L:
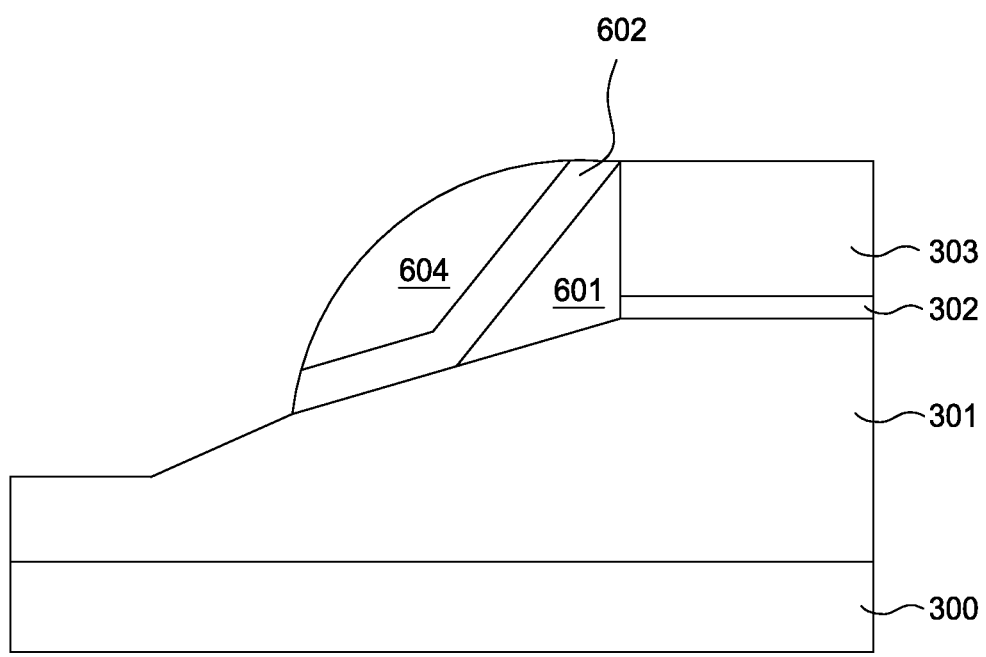
Figure 6M:
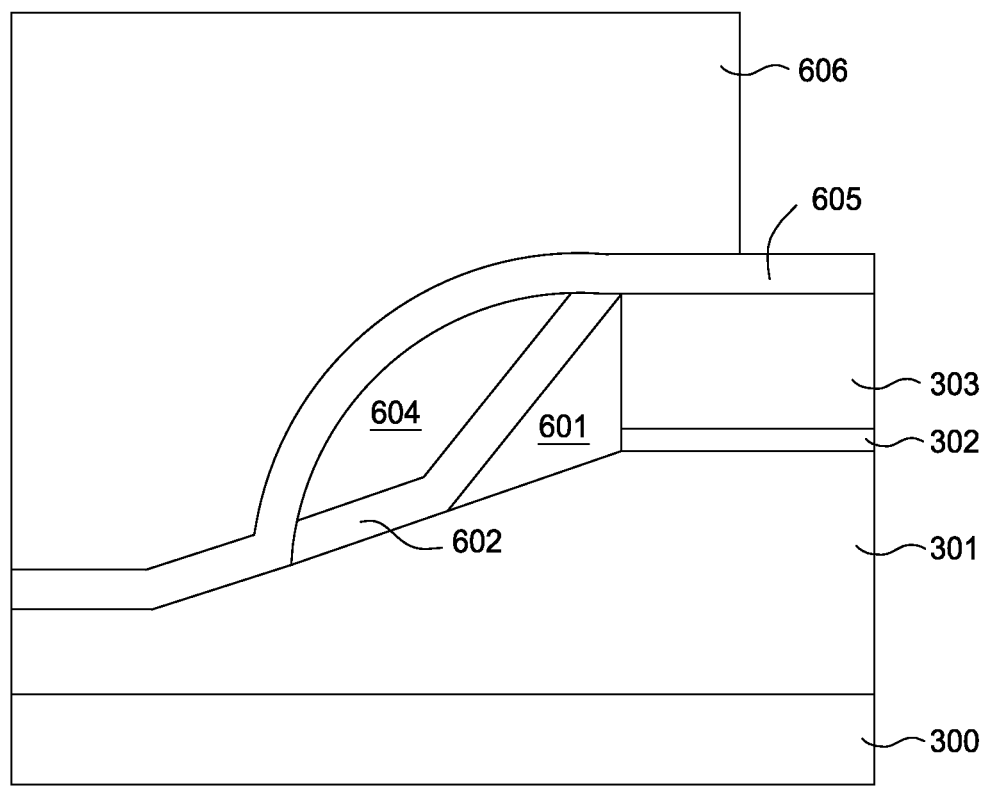

After forming the non-magnetic layer 604, a further ion milling step may be performed to remove exposed portions of the hard mask layer 602 and extend the tapered region further. Removing the exposed portions of the hard mask layer 602 may expose the magnetic pole 301 and the non-magnetic layer 303, as illustrated in FIG. 6L. In one embodiment, a further non-magnetic layer 605 may be deposited on at least the exposed portion of the magnetic pole 301, and a shield layer 606 may be plated thereon, as illustrated in FIG. 6M. In one embodiment, the combination of the non-magnetic layers 303, 601, 604, and 605, RIE stop layer 302, and hard mask layer 602 may form the gap layer 256 illustrated in FIG. 2A.

By providing a front bump layer that provides a greater separation distance between a write pole and a shield layer near a tapered portion of the write pole, embodiments of the invention greatly improve the performance of magnetic write heads.

While the foregoing is directed to embodiments of the present invention, other and further embodiments of the invention may be devised without departing from the basic scope thereof, and the scope thereof is determined by the claims that follow.

The invention claimed is:

1. A magnetic head, comprising:
   a flared write pole having a tapered region proximate an air bearing surface of the magnetic head, wherein flared portions of the write pole are formed by transferring a pattern of a masking layer into a write pole layer;
   a first non-magnetic layer formed on the masking layer, wherein the first non-magnetic layer is formed over the tapered region of the write pole;

a second non-magnetic layer formed over at least a pole tip region and the tapered region of the write pole; and a shield layer formed on the second non-magnetic layer, further comprising a third non-magnetic layer formed between the masking layer and the tapered region of the write pole.

2. The magnetic head of claim 1, wherein the first non-magnetic layer, the second non-magnetic layer, and the third non-magnetic layer are formed with at least one of:
Tantalum (Ta);
Tantalum Oxide (TaO);
Ruthenium (Ru);
Nickel-Chromium (NiCr);
Silicon-Carbide (SiC); and
Aluminum Oxide ($Al_2O_3$).

3. The magnetic head of claim 2, wherein a width of the first non-magnetic layer is at or near 200 nm.

4. The magnetic head of claim 2, wherein the tapered region has a taper angle between 25 degrees and 40 degrees.

5. The magnetic head of claim 2, wherein a width of the first non-magnetic layer is between 40 nm and 150 nm.

6. The magnetic head of claim 2, wherein a width of the tapered region is at or near 250 nm.

7. The magnetic head of claim 1, wherein a width of the first non-magnetic layer is at or near 200 nm.

8. The magnetic head of claim 1, wherein the tapered region has a taper angle between 25 degrees and 40 degrees.

9. The magnetic head of claim 1, wherein a width of the first non-magnetic layer is between 40 nm and 150 nm.

10. The magnetic head of claim 1, wherein a width of the tapered region is at or near 250 nm.

11. A magnetic head, comprising:
a flared write pole having a tapered region proximate an air bearing surface of the magnetic head, wherein flared portions of the write pole are formed by transferring a pattern of a masking layer into a write pole layer;

a first non-magnetic layer formed on the masking layer, wherein the first non-magnetic layer is formed over the tapered region of the write pole;

a second non-magnetic layer formed over at least a pole tip region and the tapered region of the write pole; and a shield layer formed on the second non-magnetic layer, wherein the first non-magnetic layer and the second non-magnetic layer are formed with at least one of:
Tantalum (Ta);
Tantalum Oxide (TaO);
Ruthenium (Ru);
Nickel-Chromium (NiCr);
Silicon-Carbide (SiC); and
Aluminum Oxide ($Al_2O_3$).

12. The magnetic head of claim 11, wherein a width of the first non-magnetic layer is between 40 nm and 200 nm.

13. The magnetic head of claim 12, wherein the tapered region has a taper angle between 25 degrees and 40 degrees.

14. The magnetic head of claim 11, wherein the tapered region has a taper angle between 25 degrees and 40 degrees.

15. The magnetic head of claim 14, wherein a width of the tapered region is at or near 250 nm.

* * * * *

UNITED STATES PATENT AND TRADEMARK OFFICE
CERTIFICATE OF CORRECTION

| | | |
|---|---|---|
| PATENT NO. | : 8,451,560 B2 | Page 1 of 1 |
| APPLICATION NO. | : 12/634480 | |
| DATED | : May 28, 2013 | |
| INVENTOR(S) | : Hong et al. | |

It is certified that error appears in the above-identified patent and that said Letters Patent is hereby corrected as shown below:

On the Title Page, Item [73]:

Please delete "San Jose, CA (US)" and insert --Amsterdam (NL)-- therefor;

In the Specifications:

Column 4, Line 27, please delete "51" and insert --S1-- therefor;

Column 8, Line 41, please delete "it" and insert --$L_1$-- therefor.

Signed and Sealed this
Eighteenth Day of March, 2014

Michelle K. Lee
*Deputy Director of the United States Patent and Trademark Office*